United States Patent
Nakajima et al.

(10) Patent No.: US 7,645,210 B2
(45) Date of Patent: *Jan. 12, 2010

(54) CONTROL APPARATUS FOR AN AUTOMATIC TRANSMISSION AND RELATED CONTROL METHOD

(75) Inventors: Nobuyori Nakajima, Kariya (JP); Takaji Murakawa, Anjo (JP); Tetsuji Kozaki, Aichi-ken (JP)

(73) Assignee: DENSO Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/149,021

(22) Filed: Apr. 25, 2008

(65) Prior Publication Data

US 2008/0207394 A1 Aug. 28, 2008

Related U.S. Application Data

(62) Division of application No. 11/214,885, filed on Aug. 31, 2005, now Pat. No. 7,503,873.

(30) Foreign Application Priority Data

Aug. 31, 2004 (JP) ............................. 2004-252220

(51) Int. Cl.
B60W 10/04 (2006.01)
(52) U.S. Cl. ...................................... 477/107
(58) Field of Classification Search ............... None
See application file for complete search history.

(56) References Cited

U.S. PATENT DOCUMENTS 5,501,642 A 3/1996 Inuzuka et al.
6,908,413 B2 6/2005 Ayabe et al.
7,285,071 B2 * 10/2007 Nakajima et al. ........... 477/107
7,503,873 B2 * 3/2009 Nakajima et al. ........... 477/107

FOREIGN PATENT DOCUMENTS

JP 05-338469 12/1993

(Continued)

OTHER PUBLICATIONS

Office Action dated Sep. 10, 2008 in JP Patent Application No. 2004-252220 with English translation.

*Primary Examiner*—Dirk Wright
(74) *Attorney, Agent, or Firm*—Nixon & Vanderhye P.C.

(57) ABSTRACT

In executing an ETC cooperative downshift operation based on a driver's intent to decelerate, this system executes an engine output increasing control (e.g. a combination of a throttle opening control and a fuel injection restoring control) for increasing the engine output irrespective of driver's accelerator operation. At the timing a reduction amount in an input shaft rotational speed Nt exceeds a predetermined value K after the ETC cooperative downshift control is started, it is presumed that the hydraulic pressure of a to-be-disengaged clutch is already reduced to a hydraulic pressure level equivalent to a predetermined transmission torque capacity that causes no undesirable acceleration or shock even if the engine output increasing control is started. And, under such assumption, the engine output increasing control is started at this timing. Accordingly, the present invention can accurately set the start timing of the engine output increasing control so as to suppress any undesirable acceleration or shock caused by the engine output increasing control.

18 Claims, 34 Drawing Sheets

FOREIGN PATENT DOCUMENTS

| | | |
|---|---|---|
| JP | 06-001163 | 1/1994 |
| JP | 06-017671 | 1/1994 |
| JP | 06-262966 | 9/1994 |
| JP | 07-166902 | 6/1995 |
| JP | 07-247874 | 9/1995 |
| JP | 09-086227 | 3/1997 |
| JP | 11-036920 | 2/1999 |
| JP | 2004-169867 | 6/2004 |

* cited by examiner

FIG. 4

| RANGE \ CLUTCH & BRAKE | C1 | B1 | C2 | C0 | B0 |
|---|---|---|---|---|---|
| R | ○ |  |  |  | ○ |
| P·N |  |  |  |  |  |
| 1ST SPEED |  |  |  | ○ | ○ |
| 2ND SPEED |  | ○ |  | ○ |  |
| 3RD SPEED |  |  | ○ | ○ |  |
| 4TH SPEED |  | ○ | ○ |  |  |

○ INDICATES ENGAGING ELEMENT WORKING FOR TORQUE TRANSMISSION

FIG. 17

THROTTLE ANGLE OR OPENING AMOUNT SETTING MAP FOR 2ND → 1ST SHIFT CHANGE

| Nt \ WATER TEMPERATURE | 20 | 40 | 60 | 80 |
|---|---|---|---|---|
| 500 | 5 | 4 | 3 | 2 |
| 1000 | 8 | 6 | 5 | |
| 1500 | 10 | 8 | 7 | |

THROTTLE ANGLE OR OPENING AMOUNT SETTING MAP FOR 3RD → 2ND SHIFT CHANGE

| Nt \ WATER TEMPERATURE | 20 | 40 | 60 | 80 |
|---|---|---|---|---|

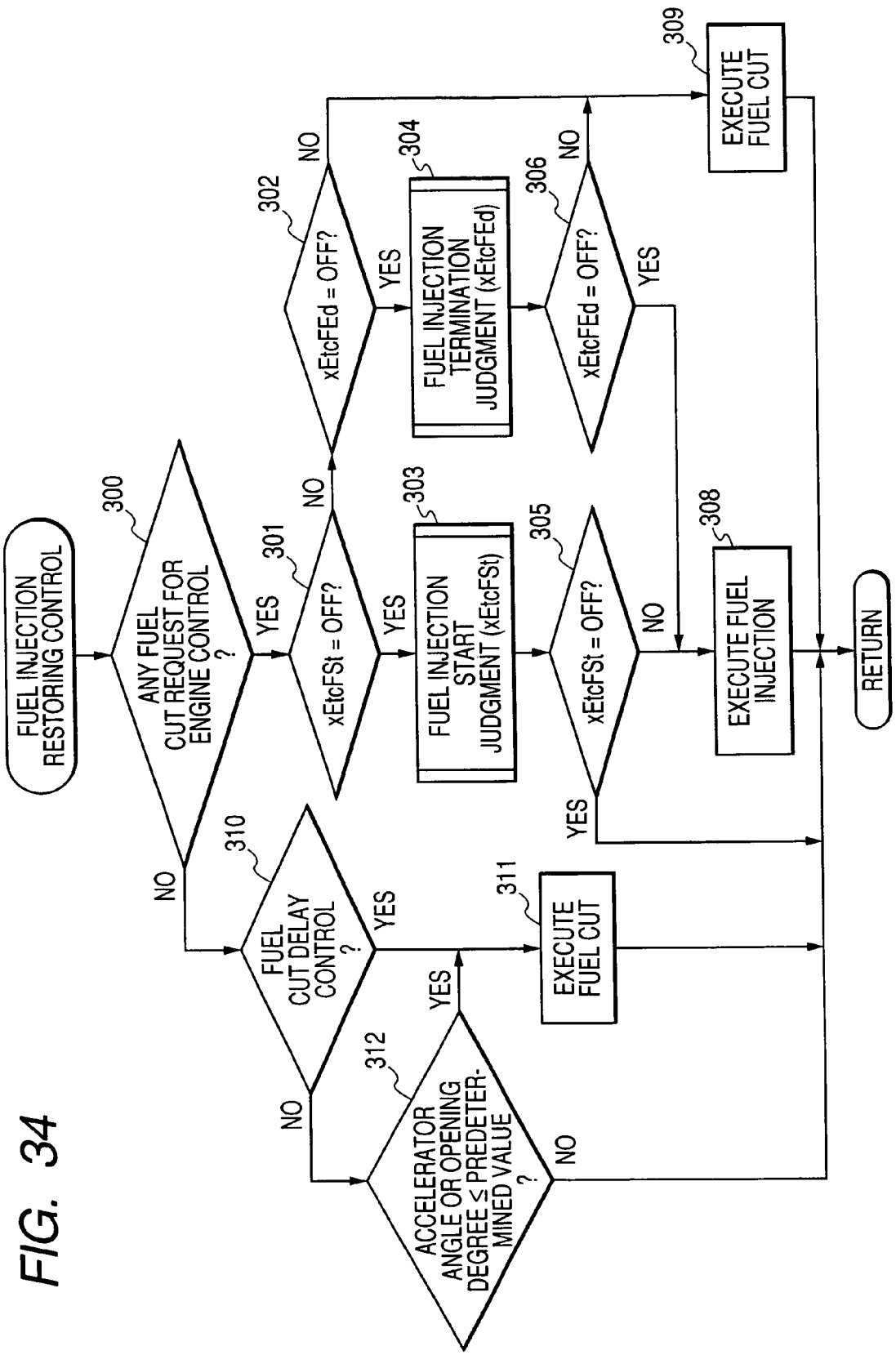

CONTROL APPARATUS FOR AN AUTOMATIC TRANSMISSION AND RELATED CONTROL METHOD

CROSS-REFERENCE TO RELATED APPLICATION

This application is a divisional of U.S. patent application Ser. No. 11/214,885 filed Aug. 31, 2005 is based upon and claims the benefit of priority from earlier Japanese Patent Application No. 2004-252220 filed on Aug. 31, 2004 so that the description of which is incorporated herein by reference.

BACKGROUND OF THE INVENTION

The present invention relates to a control apparatus for an automatic transmission that can improve a downshift control to be executed in response to a driver's intent to decelerate, and also relates to a related control method.

The automatic transmissions for automotive vehicles include a hydraulic pressure control circuit to select engagement/disengagement of a plurality of frictional engaging elements, such as hydraulically controlled clutches and brakes, to realize a plurality of gear stages. According to these automatic transmissions, when a vehicle is traveling on a descending road, a sufficient engine brake force may not be obtained even when an accelerator is operated to an OFF state. In such a case, a driver will turn off an overdrive switch or manipulate a shift lever to cause the transmission to perform a downshift operation from a D-range to an S-range and to an L-range, thereby increasing an engine brake force.

When a downshift operation for increasing an engine brake force is performed in such an accelerator OFF state in response to a driver's intent to decelerate (i.e. decelerating operation), a gear ratio of the automatic transmission increases and accordingly it is necessary to increase the rotational speed of an engine. However, in a driving mode requiring such an engine brake, as a throttle valve is closed, the frictional engaging elements activated to establish an intended gear stage in this downshift operation will transmit a torque of an output side to the engine. Thus, the engine rotational speed will increase. Accordingly, a shift time will be long. A required engine brake will not be obtained at a desired timing. An inertia torque caused due to increase in the engine rotational speed will appear as a braking torque of a vehicle. This will temporarily increase the engine brake force and cause a shift shock. Furthermore, abruptly increasing a transmission torque of a frictional engaging element to shorten a shift time, for example by controlling a hydraulic pressure of the automatic transmission, will quickly increase the engine rotational speed and accordingly the braking torque will abruptly increase and a large shift shock will occur.

To solve this problem, Japanese Patent No. 2924463 (referred to as Prior Art Document 1) discloses a control technique according to which an engine output increasing means for temporarily increasing an engine output when an automatic transmission is shifted down to a low-speed gear stage that is capable of producing an engine brake in a condition that an accelerator is in an OFF state. During the downshift operation, a timer measures a time elapsed from predetermined measurement start timing, such as shift output timing for switching a hydraulic pressure control circuit. During a downshift operation, a slip occurs in a frictional engaging element of a high-speed gear stage to be disengaged. Meanwhile, a frictional engaging element of a low-speed gear stage starts engaging during this downshift operation. The engine rotational speed must be increased until the frictional engaging element of a low-speed gear stage is completely engaged. The engine output increasing means starts an engine output increasing control based on the elapsed time measured by the timer. The start timing of this engine output increasing control is set with reference to vehicle operating conditions (e.g. oil temperature in a hydraulic pressure control circuit, or engine rotational speed) that give effects on an engagement/disengagement delay time of the frictional engaging element or a delay time in increasing the engine output.

Furthermore, there is a delay time before the frictional engaging element of an automatic transmission is actually disengaged or engaged. Furthermore, there is a delay time before the engine output actually starts increasing when a throttle opening control is performed to increase the engine output. The above-described Prior Art Document 1 proposes to shorten the shift time without causing any shift shock by taking these delay times into consideration in setting the start timing, and also discloses that a throttle valve opening control should be performed to cause the engine to increase its rotational speed when any slip occurs in the frictional engaging element of a high-speed gear stage.

However, the delay time required for the frictional engaging element to actually disengage or engage during a downshift operation is dependent on not only the oil temperature in a hydraulic pressure control circuit or the engine rotational speed but also a vehicle speed or a torque acting on this frictional engaging element when the downshift control is executed. Especially, an accelerator pedal is substantially fully closed during a downshift operation. It is necessary to consider that an arbitrary driving torque of a road load (i.e. a torque required to maintain a cruise running condition at the present traveling speed) or less is added from the engine to the transmission. Furthermore, the delay time will be dependent on the operating conditions including a slip control of a lockup clutch. Therefore, relying only a timer to set the control start time is not always accurate even if the effects of the oil temperature or the engine rotational speed are taken into consideration and, accordingly, a throttle valve opening control (i.e. engine output increasing control) may not be started at appropriate timing. Hence, the throttle valve opening control possibly starts at inappropriate timing and a driver will feel badly or receive a shock caused by the throttle valve opening control during a downshift operation. Furthermore, appropriately setting reference values of a timer considering the effects of the oil temperature or the engine rotational speed requires repetitive experiments for determining these values. Moreover, such setting of reference values of a timer will be necessary again if the contents of the hydraulic pressure control for the shift operation is changed or renewed later. Not only the control logic becomes complicated but also the many parameter settings will be required.

SUMMARY OF THE INVENTION

In view of the foregoing problems of the prior art techniques, the present invention has an object to provide a control apparatus for an automatic transmission that is capable of accurately setting start timing of an engine output increasing control when a downshift operation is executed based on a driver's intent to decelerate, and also capable of suppressing undesirable acceleration or shock occurring when the engine output increasing control is performed, and further capable of executing the engine output increasing control with a simple logical arrangement and a relatively smaller number of parameter settings.

In order to accomplish the above and other related objects, the present invention provides a first control apparatus for an automatic transmission that includes a hydraulic pressure control means for individually controlling the hydraulic pressure acting to a plurality of frictional engaging elements to selectively switch engagement and disengagement of respective frictional engaging elements, thereby switching a gear stage of a speed change mechanism. The first control apparatus for an automatic transmission includes a downshift control means for controlling the hydraulic pressure, in response to a driver's intent to decelerate, in such a manner that the speed change mechanism can cause a downshift to a gear stage capable of producing an engine brake. Furthermore, an engine output increasing means is provided to execute an engine output increasing control that increases an engine output during the downshift control irrespective of driver's accelerator operation. And, an input shaft speed detecting means is provided to detect an input shaft rotational speed of the speed change mechanism. According to the first control apparatus for an automatic transmission, the engine output increasing means starts the engine output increasing control when a reduction in the input shaft rotational speed of the speed change mechanism exceeds a predetermined value.

According to the present invention, the automatic transmission control apparatus includes the engine output increasing means that executes the engine output increasing control to increase the engine output irrespective of driver's accelerator operation when a speed change mechanism causes a downshift operation in response to a driver's intent to decelerate. This control apparatus further includes the input shaft speed detecting means that detects an input shaft rotational speed of the speed change mechanism, and the output increase start timing control means that controls the start timing of the engine output increasing control. The engine output increasing control begins at the timing a reduction in the input shaft rotational speed of the speed change mechanism exceeds a predetermined value.

In short, the present invention is made based on the fact that, when the hydraulic pressure decreases in a frictional engaging element to be disengaged after a downshift control is started, the input shaft rotational speed of the speed change mechanism decreases. At the timing a reduction in the input shaft rotational speed of the speed change mechanism exceeds a predetermined value after starting the downshift control, it is presumed that the hydraulic pressure of the frictional engaging element to be disengaged is already reduced to a hydraulic pressure level equivalent to a predetermined transmission torque capacity that causes no undesirable acceleration or shock even if the engine output increasing control is started. And, under such assumption, the engine output increasing control is started at this timing. Accordingly, the present invention can accurately set the start timing of the engine output increasing control so as to suppress any undesirable acceleration or shock caused by the engine output increasing control. Furthermore, the present invention does not rely on the timer disclosed in the above Prior Art Document 1 in setting the start timing of the engine output increasing control. Thus, the engine output increasing control can be executed with a simple logical arrangement and relatively small parameter settings. This brings the merit of easiness in practical use of this invention.

Furthermore, the present invention provides a second control apparatus for an automatic transmission that includes a hydraulic pressure control means for individually controlling the hydraulic pressure acting to a plurality of frictional engaging elements to selectively switch engagement and disengagement of respective frictional engaging elements, thereby switching a gear stage of a speed change mechanism. The second control apparatus for an automatic transmission includes a downshift control means, an engine output increasing means, an input shaft speed detecting means, and an output shaft speed detecting means. The downshift control means controls the hydraulic pressure, in response to a driver's intent to decelerate, in such a manner that the speed change mechanism can cause a downshift to a gear stage capable of producing an engine brake. The engine output increasing means executes an engine output increasing control that increases an engine output during the downshift control irrespective of driver's accelerator operation. The input shaft speed detecting means detects an input shaft rotational speed of the speed change mechanism. And, the output shaft speed detecting means detects an output shaft rotational speed of the speed change mechanism. According to the second control apparatus for an automatic transmission, the engine output increasing means starts the engine output increasing control when a reduction in a gear ratio (i.e. a ratio of the input shaft rotational speed and the output shaft rotational speed of the speed change mechanism) exceeds a predetermined value. In short, the present invention is made based on the fact that, when the input shaft rotational speed of the speed change mechanism decreases after a downshift control is started, the gear ratio (=input shaft rotational speed/output shaft rotational speed) decreases. At the timing a reduction in the gear ratio exceeds a predetermined value after starting the downshift control, it is presumed that the hydraulic pressure of a frictional engaging element to be disengaged is already reduced to a hydraulic pressure level equivalent to a predetermined transmission torque capacity that causes no undesirable acceleration or shock even if the engine output increasing control is started. And, under such assumption, the engine output increasing control is started at this timing.

However, depending on engine control conditions, the input shaft rotational speed or the gear ratio of the speed change mechanism may not decrease sufficiently even after the downshift control is started. In such a case, execution of the above-described engine output increasing control will be delayed undesirably.

Hence, according to the present invention, it is desirable to provide a timer means for measuring an elapsed time from start timing of the downshift control. And, the engine output increasing means forcibly starts the engine output increasing control when the elapsed time from the start timing of the downshift control exceeds a predetermined time, if the engine output increasing control is not started yet. According to this arrangement, the engine output increasing control can be started at appropriate timing being set beforehand even when the input shaft rotational speed or the gear ratio of the speed change mechanism does not decrease sufficiently even after the downshift control is started.

The fuel cut operation is executed when predetermined fuel cut execution conditions, including accelerator fully closed condition, are established. However, immediately starting the fuel cut operation may generate a torque shock. To solve this problem, the engine control computer executes a fuel cut delay control that delays the start timing of the fuel cut operation to eliminate undesirable torque shock. The fuel injection during the fuel cut delay control generates a significant amount of engine torque. If the engine output increasing control is started during this fuel cut delay control, an overall engine torque will become excessively large and the vehicle will be accelerated undesirably.

To solve this problem, it is preferable to provide a means for calculating a difference between an engine rotational speed and the input shaft rotational speed. And, the engine output increasing means includes means for prohibiting the engine output increasing control in response to a downshift request generated within a predetermined time after the difference between the engine rotational speed and the input shaft rotational speed exceeds a predetermined value. In short, if the difference between the engine rotational speed and the input shaft rotational speed exceed a predetermined value, it is presumed that the fuel cut delay control is currently progressing. Therefore, the engine output increasing control is postponed until at least a predetermined time elapses. Thus, this arrangement makes it possible to eliminate adverse effects caused by executing the engine output increasing control during the fuel cut delay control.

Alternatively, it is preferable to provide an accelerator opening degree detecting means for detecting an accelerator opening degree. And, the engine output increasing means includes means for prohibiting the engine output increasing control in response to a downshift request generated within a predetermined time after the accelerator opening degree becomes smaller than a predetermined value. In short, if the accelerator opening degree is lower than a predetermined value, it is presumed that the fuel cut delay control is currently progressing. Therefore, the engine output increasing control is postponed until at least a predetermined time elapses. Thus, this arrangement makes it possible to eliminate adverse effects caused by executing the engine output increasing control during the fuel cut delay control.

Furthermore, it is preferable that the engine output increasing means includes means for receiving fuel cut delay information from an engine control computer when the engine control computer is executing a fuel cut delay control that delays the start timing of a fuel cut operation, and means for prohibiting the engine output increasing control when a downshift request is generated during the fuel cut delay control. According to this arrangement, the fuel cut delay information can be directly obtained from the engine control computer and the engine output increasing control can be surely prohibited during the fuel cut delay control.

Furthermore, it is preferable that the downshift control means immediately decreases a hydraulic pressure command value to a minimum hydraulic pressure or its vicinity for a frictional engaging element to be disengaged when the downshift control is started. According to this arrangement, it becomes possible to quickly reduce the hydraulic pressure to a hydraulic pressure level equivalent to a transmission torque capacity for the frictional engaging element to be disengaged when the downshift control is started. Thus, the engine output increasing control can be quickly started and the shift time required for the downshift can be shortened.

Furthermore, it is preferable to provide a fuel cut executing means for executing a fuel cut operation in response to execution of the downshift control until the engine output increasing control is started. In other words, the fuel cut delay control is stopped during this period. If the hydraulic pressure command value for the frictional engaging element to be disengaged is immediately reduced to a minimum value or its vicinity to promptly reduce the transmission torque capacity of the frictional engaging element to be disengaged when the downshift control is started, the input shaft rotational speed or the gear ratio of the speed change mechanism can be reduced without generating any torque shock even if the fuel cut delay control is immediately stopped and the fuel cut operation is started. The engine output increasing control can be started at earlier timing so that the downshift operation can be quickly accomplished.

In this case, the fuel cut executing means executes the fuel cut operation only when an engine control computer is executing a fuel cut delay control that delays the start timing of the fuel cut operation. According to this arrangement, it becomes possible to prevent the engine from stalling due to execution of the fuel cut operation in a case the fuel injection is carried out in response to a request other than the fuel cut delay, for example, when a small amount of fuel is injected to maintain engine rotations in a low-speed region.

Furthermore, there is a possibility that the input shaft rotational speed does not decrease so smoothly when the accelerator pedal is depressed after the downshift control is started. Thus, a relatively long time will be required to start the engine output increasing control.

To solve this problem, it is preferable that the fuel cut executing means executes the fuel cut operation when an accelerator opening degree is less than a predetermined value. According to this arrangement, it becomes possible to lower the input shaft rotational speed by executing the fuel cut operation even in a condition that the accelerator pedal is slightly depressed after the downshift control is started. Thus, the engine output increasing control can be smoothly started.

Moreover, the present invention provides control methods related to the above-described first and second control apparatuses for an automatic transmission.

BRIEF DESCRIPTION OF THE DRAWINGS

The above and other objects, features and advantages of the present invention will become more apparent from the following detailed description which is to be read in conjunction with the accompanying drawings, in which:

FIG. 4 is a diagram showing a combination of engagement/disengagement of clutches C0 to C2 and brakes B0 and B1 of respective gear stages;

FIG. 17 is one example of a throttle opening amount setting map in accordance with the first embodiment of the present invention;

FIG. 34 is a flowchart showing processing flow of the fuel injection restoring control routine in accordance with an eighth embodiment of the present invention.

DESCRIPTION OF THE PREFERRED EMBODIMENTS

Hereinafter, preferable embodiments of the present invention will be explained with reference to attached drawings.

First Embodiment

Figure 1:
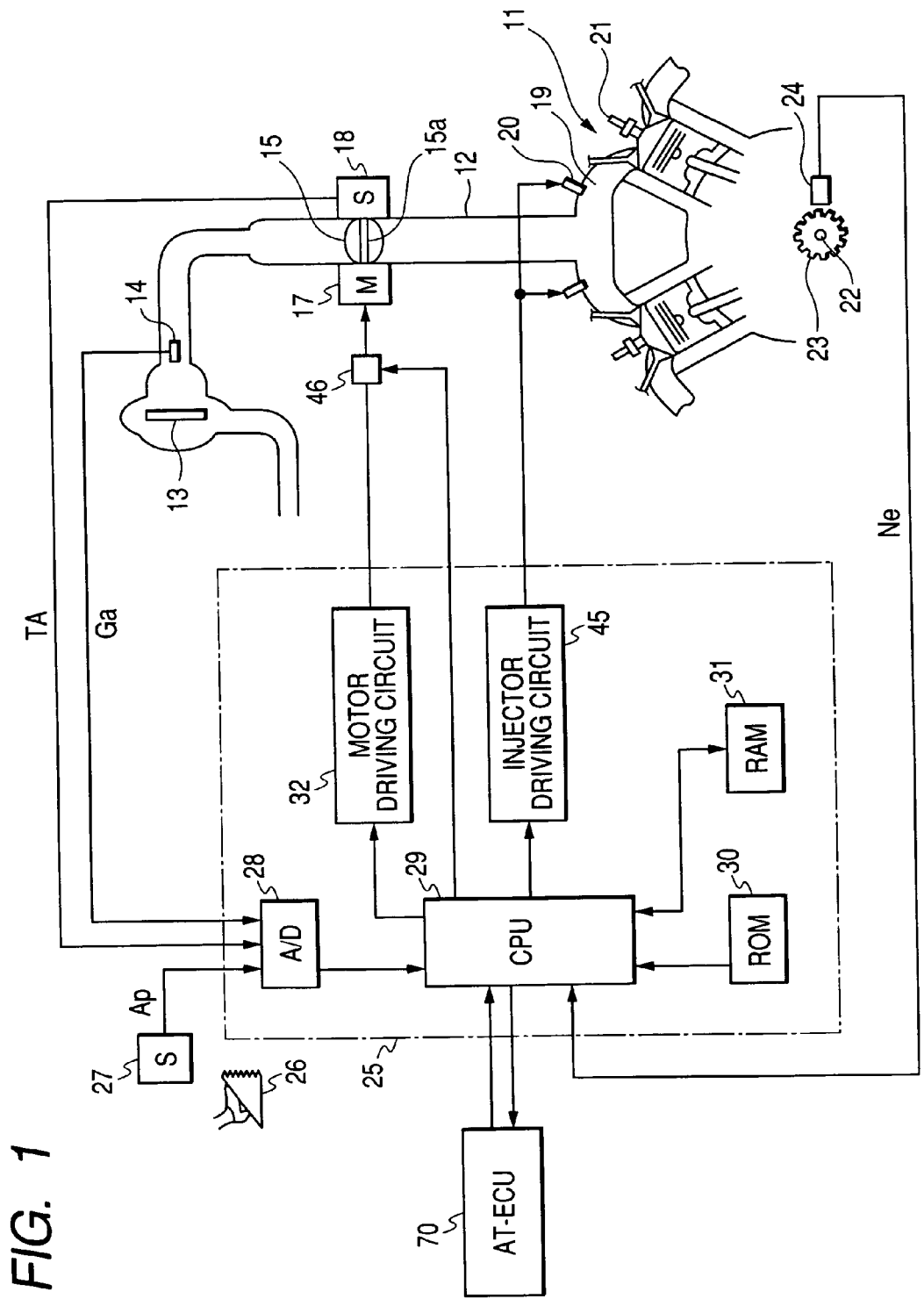
FIG. 1 is a diagram schematically showing an overall arrangement of an engine control system in accordance with each embodiment of the present invention.

A first embodiment of the present invention will be explained with reference to FIGS. 1 to 22. FIG. 1 schematically shows an overall arrangement of a control system for an internal combustion engine 11. The engine 11 has an intake pipe 12, an air cleaner 13 disposed at an upstream portion of the intake pipe 12, and an air flow meter 14 disposed at a downstream side of the air cleaner 13 to measure an intake air amount Ga. Furthermore, a throttle valve 15 is provided at a downstream side of the air flow meter 14. A motor 17, such as a DC motor, is connected to a rotational shaft 15a of the throttle valve 15. The motor 17 generates a driving force for controlling an opening degree of the throttle valve 15 (i.e. throttle opening degree). A throttle opening degree sensor 18 detects the throttle opening degree.

The intake air, after having passed the throttle valve 15, flows into an intake manifold 19 that introduces the intake air into each cylinder of the engine 11. A predetermined number of injectors 20, each being provided for a corresponding cylinder, are attached to the intake manifold 19. Furthermore, an ignition plug 21 is attached to a cylinder head of each cylinder of the engine 11. A signal rotor 23 is coupled around the crank shaft 22 of the engine 11. A crank angle sensor 24 (functioning as engine rotational speed detecting means) is located in confronting relationship with the signal rotor 23. The crank angle sensor 24 outputs pulses representing an engine rotational speed signal Ne. An engine ECU 25 (functioning as engine control computer) inputs the engine rotational speed signal Ne and detects an engine rotational speed based on the pulse frequency of the engine rotational speed signal Ne.

Meanwhile, an accelerator sensor 27 (functioning as accelerator opening degree detecting means) detects a depression amount of an accelerator pedal 26 (i.e. accelerator opening degree). An electronic control unit 25 inputs a voltage signal AP representing the accelerator operation amount via an A/D converter 28. Furthermore, the engine ECU 25 inputs a voltage signal representing the intake air amount Ga detected by the air flow meter 14 and a voltage signal representing a throttle opening degree TA detected by the throttle opening degree sensor 18 via the A/D converter 28.

The engine ECU 25, chiefly including a CPU 29, a ROM 30, and a RAM 31, causes the CPU 29 to execute various routines for engine control stored in the ROM 30. For example, the engine ECU 25 controls the ignition timing of the ignition plug 21 and also controls control the fuel injection amount by adjusting a pulse width of an injection signal given to the injector 20 via an injector driving circuit 45.

Furthermore, the engine ECU 25 causes the CPU 29 to execute various routines for throttle control stored in the ROM 30. More specifically, the engine ECU 25 feedback controls the motor 17 of the throttle valve 15 via a motor driving circuit 32, for example based on a PID control, so that the throttle opening degree detected by the throttle opening degree sensor 18 agrees with a target throttle opening degree. If the electronic throttle system is in an abnormal condition, a safety circuit 46 will stop supplying electric power to the motor 17. The safety circuit 46 is provided in an electric power supply path between the motor driving circuit 32 and the motor 17. In this condition, the throttle opening degree is held at a predetermined opening degree so that the vehicle can escape from a dangerous situation.

Next, a schematic arrangement of the automatic transmission 51 will be explained with reference to FIGS. 2 and 3. As shown in FIG. 3, an output shaft of the engine 11 is connected to an input shaft 53 of a torque converter 52. An output shaft 54 of the torque converter 52 is connected to a speed change gear mechanism 55 (i.e. speed change mechanism) of a hydraulic pressure driven type. A pump impeller 71 and a turbine runner 72 disposed in an opposed relationship in the torque converter 52 cooperatively arrange a fluid coupling. A stator 73, provided between the pump impeller 31 and the turbine runner 72, regulates the flow of oil in the torque converter 52. The pump impeller 71 is connected to the input shaft 53 of the torque converter 52. The turbine runner 32 is connected to the output shaft 54 of the torque converter 52.

Furthermore, the torque converter 52 includes a lockup clutch 56 provided for selectively connecting or disconnecting the input shaft 53 and the output shaft 54. The output torque of the engine is transmitted via the torque converter 52 to the speed change gear mechanism 55. The speed change gear mechanism 55 includes a plurality of gears (planetary gears or the like) that changes the rotational speed and transmits an output rotation to driving wheels (e.g. front wheels or rear wheels) of the vehicle.

The speed change gear mechanism 55 includes a plurality of clutches C0, C1, and C2 and brakes B0 and B1 that are frictional engaging elements for switching a plurality of gear stages. The hydraulic pressure supplied to these frictional engaging elements is selectively controlled to realize a combination of engagement/disengagement of clutches C0, C1, and C2 and brakes B0 and B1 shown in FIG. 4. In this manner, by switching the combination of gears used to transmit a driving force, a gear ratio of the speed change gear mechanism 55 is switchable.

FIG. 4 shows a practical example of engagement/disengagement of clutches C0, C1, and C2 and brakes B0 and B1 of a 4-speed automatic transmission, in which the clutch or the brake indicated by ○ is held in an engaged state (i.e. torque transmittable state) at a designated gear stage and the clutch or the brake being not indicated by ○ is held in a disengaged state. For example, when the throttle is continuously opened in the D-range, the speed change gear mechanism 55 successively upshifts to 1st speed, 2nd speed, 3rd speed, and 4th speed in accordance with increase in the vehicle speed. In the shift change operation from 1st speed to 2nd speed, the brake B0 is disengaged and the brake B1 is newly engaged after canceling the combination of engaged elements C0 and B0. In the shift change operation from 2nd speed to 3rd speed, the brake B1 is disengaged and the clutch C2 is newly engaged after canceling the combination of engaged elements C0 and B1. In the shift change operation from 3rd speed to 4th speed, the clutch C0 is disengaged and the brake B1 is newly engaged after canceling the combination of engaged elements C0 and C2.

For example, during the shift change operation from 2nd speed to 3rd speed, the hydraulic pressure of the brake B1 may not decrease due to its malfunction and may be continuously held in an engaged state. If the clutch C2 is engaged in this condition, interlock will occur between two elements B1 and C2 and the driving wheels will be stopped. To avoid this drawback, a fail-safe mechanism is provided. More specifically, each clutch (or brake) in the speed change gear mechanism 55 is equipped with a hydraulic pressure switch (not shown) as fail detecting means for detecting the hydraulic pressure acting to this clutch (or brake). The hydraulic pressure switch turns on (produces a Hi output) when the actual hydraulic pressure exceeds a threshold value and turns off (produces a Lo output) when the actual hydraulic pressure falls below the threshold value. The clutch having abnormality is detectable by judging whether or not the output of this hydraulic pressure switch (i.e. actual hydraulic pressure) agrees with a hydraulic pressure command value. Based on this detection result, it is possible to prevent the speed change gear mechanism 55 from shifting to the gear stage that causes the above-described interlock.

Figure 2:
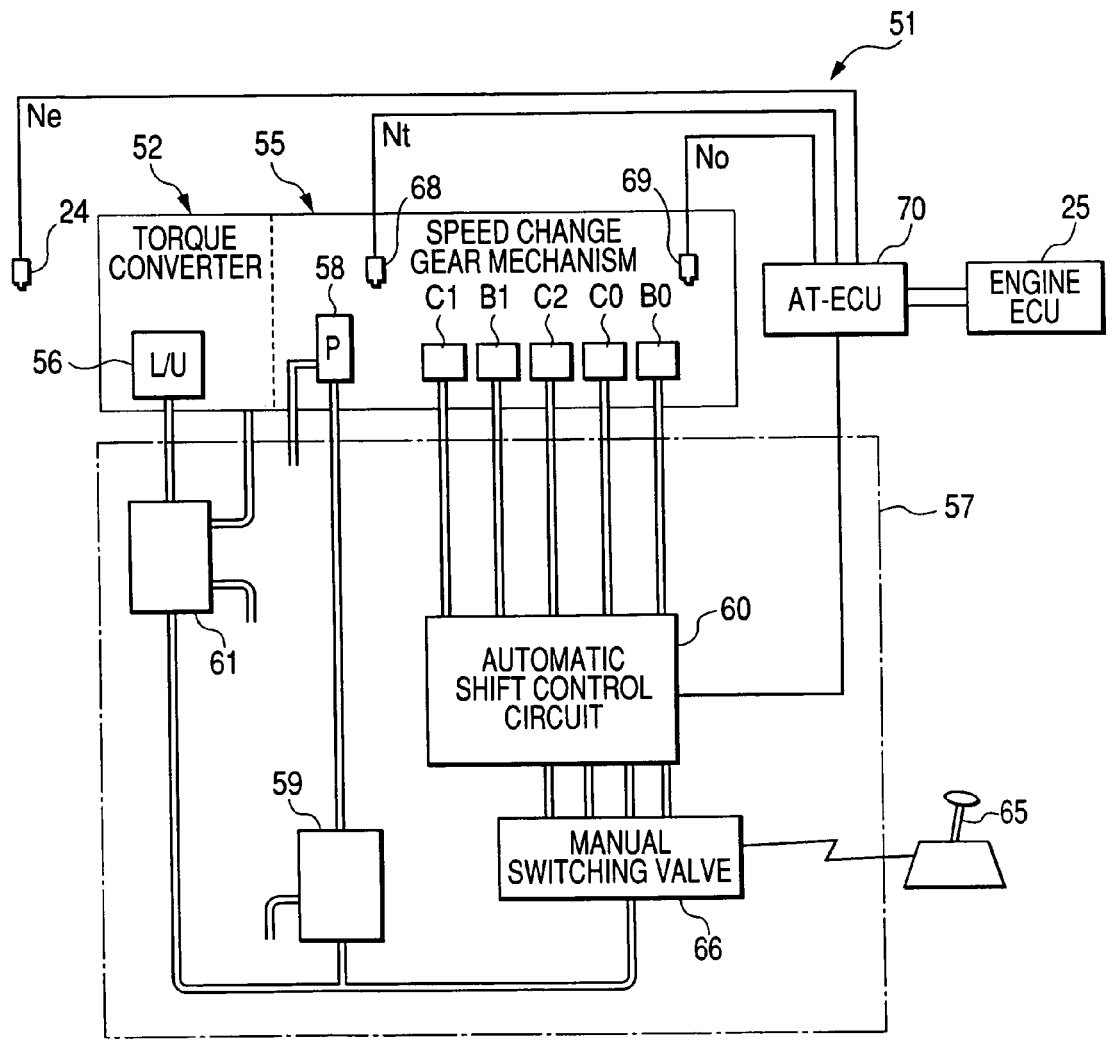
FIG. 2 is a diagram schematically showing an overall arrangement of an automatic transmission.
Figure 3:
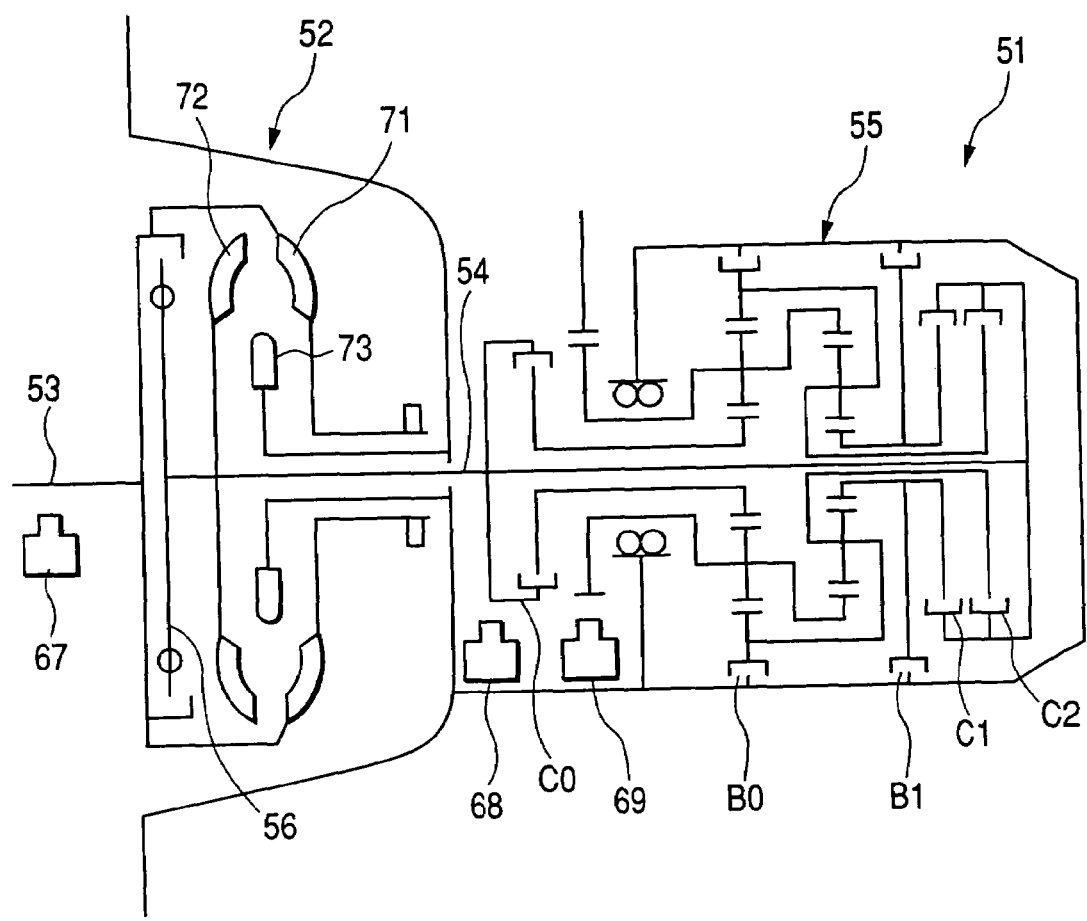
FIG. 3 is a diagram showing a mechanical arrangement of the automatic transmission.

As shown in FIG. 2, the speed change gear mechanism 55 includes a hydraulic pressure pump 58 driven by an engine driving force. A hydraulic pressure control circuit 57 is provided in an oil pan (not shown) that stores hydraulic fluid (i.e. oil). This hydraulic pressure control circuit 57 includes a line pressure control circuit 59, an automatic shift control circuit 60, a lockup control circuit 61, and a manual switching valve 66. The hydraulic fluid sucked up by the hydraulic pressure pump 58 from the oil pan is supplied via the line pressure control circuit 59 to the automatic shift control circuit 60 and the lockup control circuit 61. The line pressure control circuit 59 includes a hydraulic pressure control valve (not shown) provided to control the hydraulic pressure supplied from the hydraulic pressure pump 58 to a predetermined line pressure. The automatic shift control circuit 60 includes a plurality of hydraulic pressure control valves used for the shift change (i.e. hydraulic pressure control means) that control the hydraulic pressure supplied to respective clutches C0, C1, and C2 and brakes B0 and B1 in the speed change gear mechanism 55. Furthermore, the lockup control circuit 61 includes a hydraulic pressure control valve (not shown) used for the lockup operation that controls the hydraulic pressure supplied to the lockup clutch 56.

Each hydraulic pressure control valve, which is for example arranged by a linear solenoid valve, controls the hydraulic pressure in accordance with a magnetic force generated by the current flowing when a predetermined duty of voltage is applied. Therefore, the current of the hydraulic pressure control valve and the hydraulic pressure to be produced are in a close relationship. Controlling a current value makes it possible to accurately control the hydraulic pressure. Furthermore, to absorb differences in the current value relative to the duty, an automatic transmission electronic control circuit (hereinafter, referred to as "AT-ECU") 70 feedback controls the current value based on a detection value monitored by a current detecting means (not shown).

Furthermore, the manual switching valve 66 is provided between the line pressure control circuit 59 and the automatic shift control circuit 60. A shift lever 65 switches the position of the manual switching valve 66. When the shift lever 65 is in a neutral range (i.e. N-range) or in a parking range (i.e. P-range), the manual switching valve 66 supplies the hydraulic pressure to the speed change gear mechanism 55 in such a manner that the speed change gear mechanism 55 is brought into a neutral condition even when the hydraulic pressure control valves of the automatic shift control circuit 60 receive no electric power (i.e. in an OFF state).

The speed change gear mechanism 55 includes an input shaft rotational speed sensor 68 (functioning as input shaft speed detecting means) that detects an input shaft rotational speed Nt of the speed change gear mechanism 55 (i.e. output shaft rotational speed of torque converter 52) and an output shaft rotational speed sensor 69 (functioning as output shaft speed detecting means) that detects an output shaft rotational speed No of the speed change gear mechanism 55.

Figure 5:
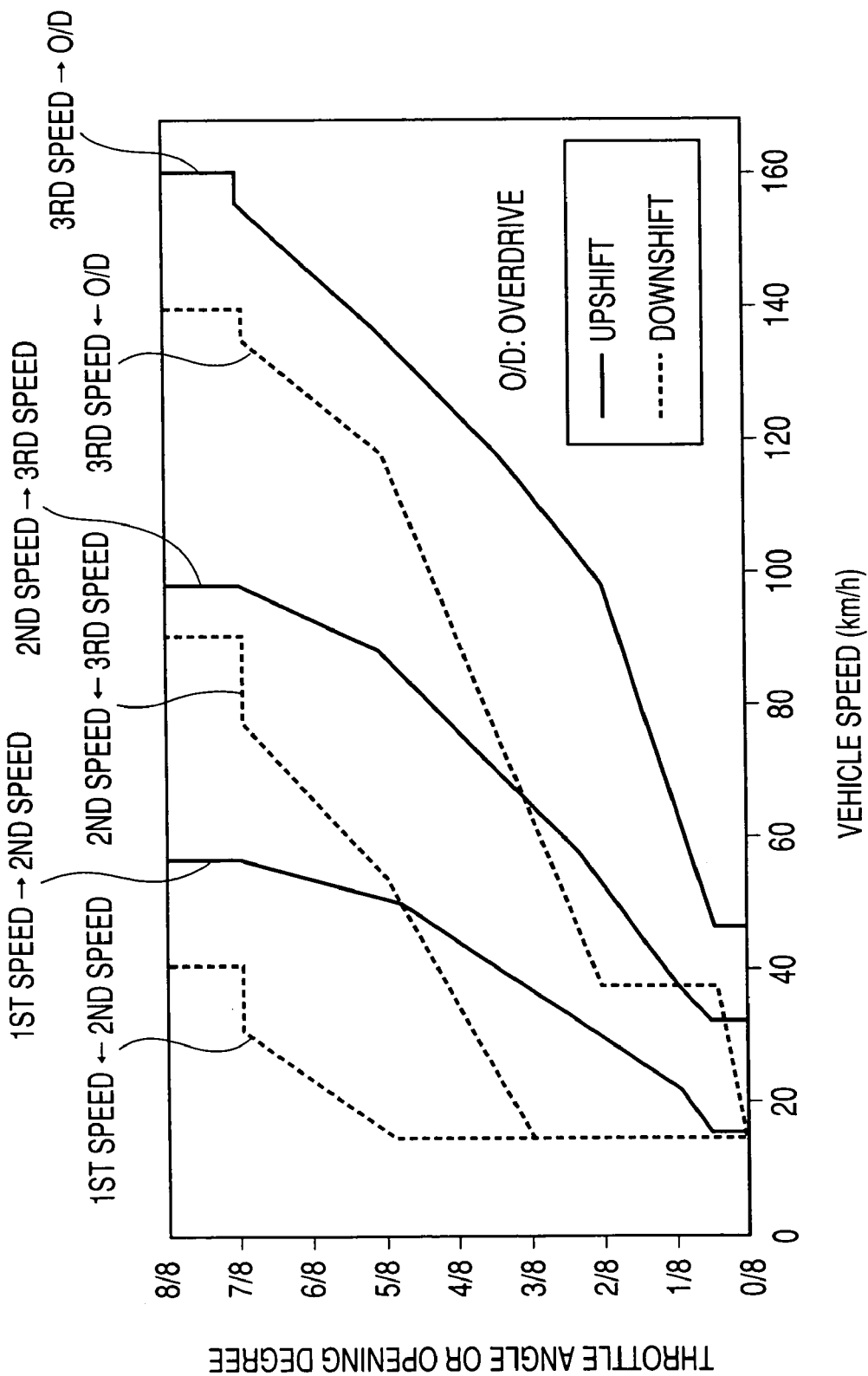
FIG. 5 is a graph showing an example of shift pattern.

The AT-ECU 70 inputs the output signals of these sensors. The AT-ECU 70, chiefly arranged by a microcomputer, executes various routines stored in a built-in ROM (i.e.

recording medium) to cause the speed change gear mechanism 55 to perform shift-change operations according to a predetermined shift pattern shown in FIG. 5. More specifically, the AT-ECU 70 controls electric power supply to respective hydraulic pressure control valves of the automatic shift control circuit 60 with reference to the operated position of the shift lever 65 and driving conditions (i.e. throttle opening degree, vehicle speed, or the like). Thus, the hydraulic pressure acting to the clutches C0, C1, and C2 and brakes B0 and B1 of the speed change gear mechanism 55 is switched so as to realize the engagement/disengagement of clutches C0, C1, and C2 and brakes B0 and B1 as shown in FIG. 4. The gear ratio of the speed change gear mechanism 55 is changeable by selecting the combination of gears used to transmit the driving force.

Figure 6:
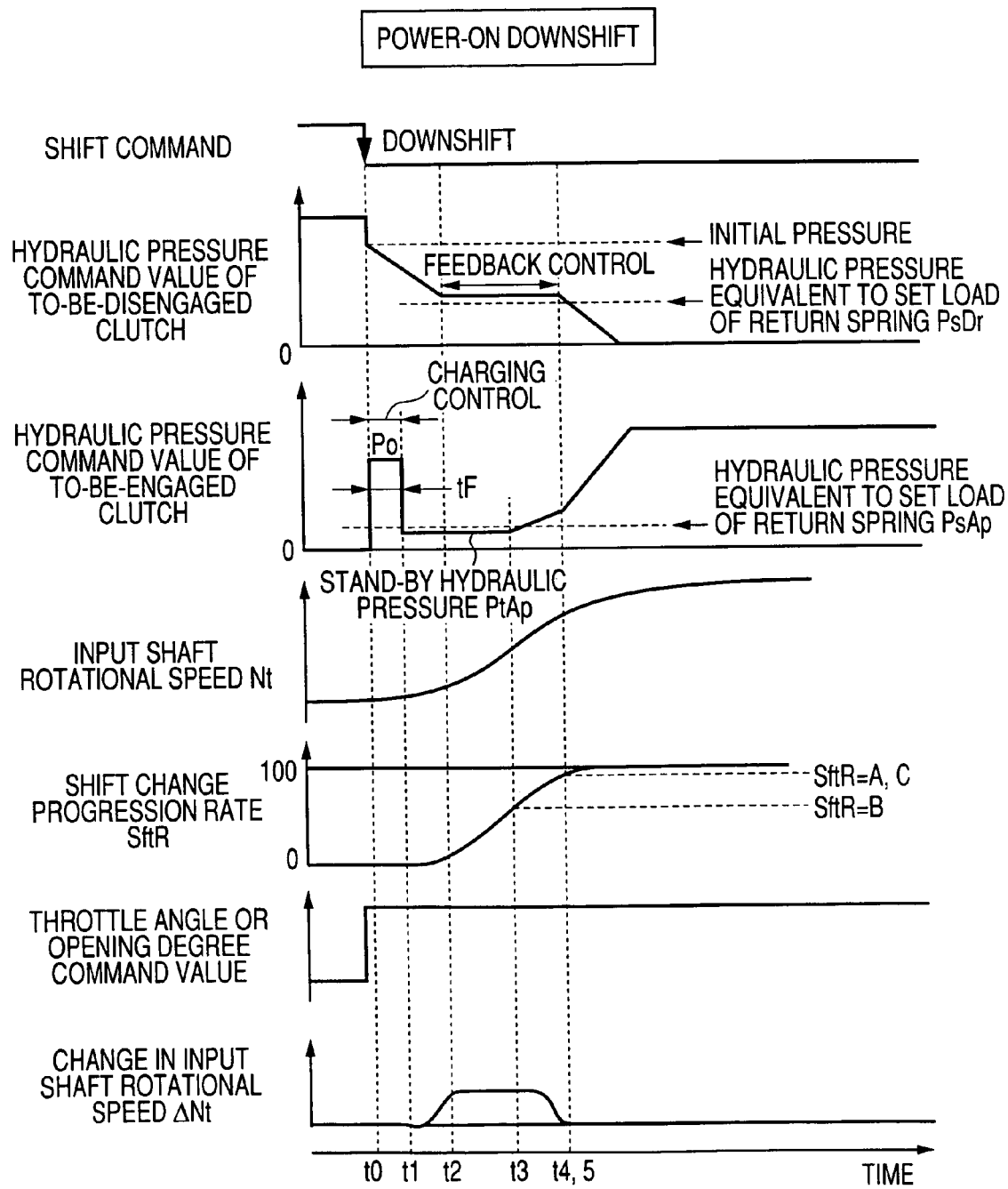
FIG. 6 is a time diagram showing one example of a power-on downshift control.
Figure 7:
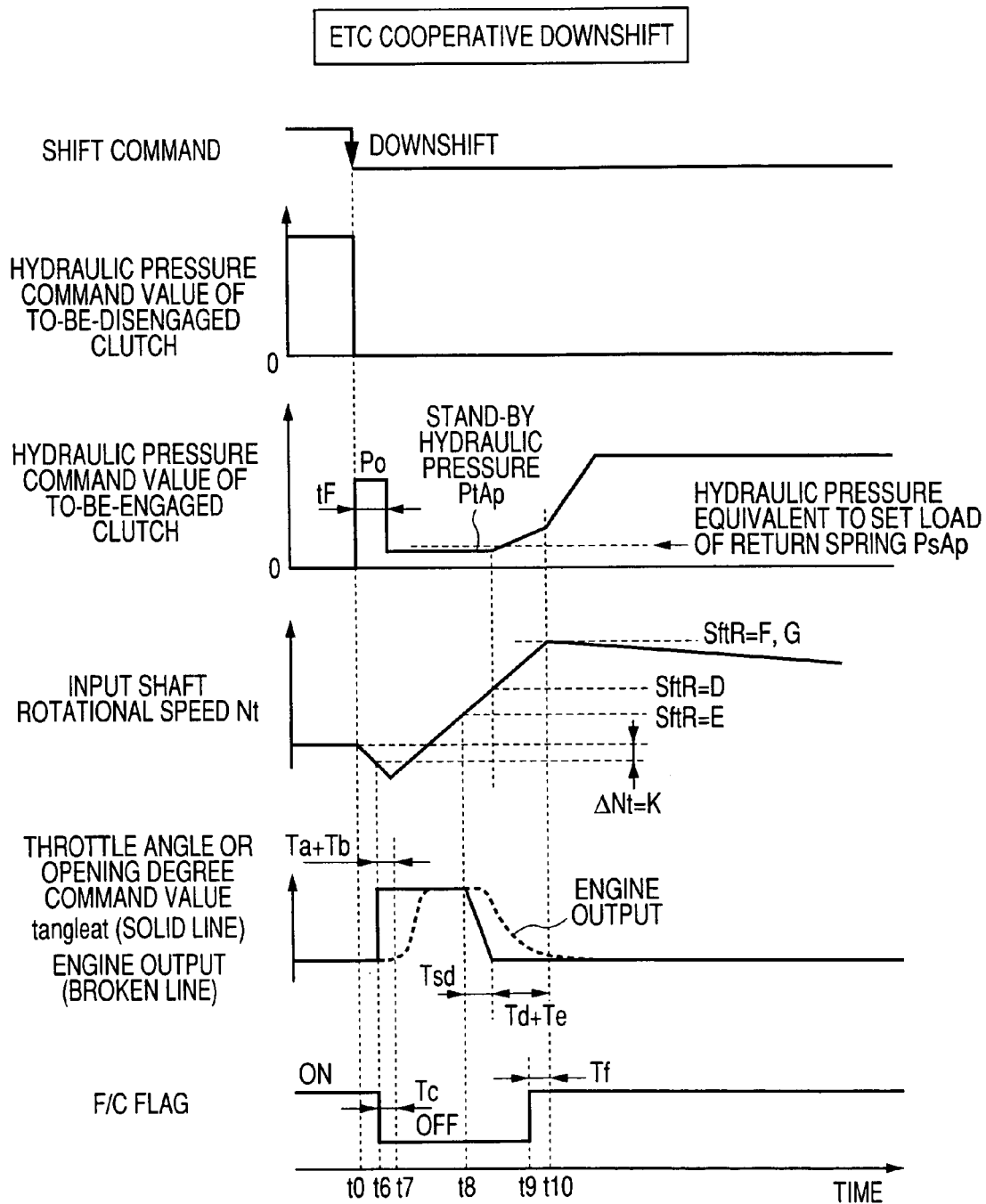
FIG. 7 is a time diagram showing one example of an ETC cooperative downshift control in accordance with a first embodiment of the present invention.

FIGS. 6 and 7 show downshift operations performed by the AT-ECU 70. For simplification, the brakes B0 and B1 are referred to as "clutches B0 and B1" in the following description. In other words, the frictional engaging elements of this embodiment are simply referred to as clutches C0, C1, C2, B0 and B1. Furthermore, a clutch to be switched from engaged state to disengaged state during a downshift control is expressed as "to-be-disengaged clutch" while a clutch to be switched from disengaged state to engaged state is expressed as "to-be-engaged clutch" hereinafter.

FIG. 6 is a time diagram showing a control example of "power-on downshift" that causes the transmission to downshift in response to a driver's depression of the accelerator pedal 26. FIG. 7 is a time diagram showing a control example of "ETC cooperative downshift" that executes an engine output increasing control during a downshift operation performed to generate an engine brake in response to a driver's intent to decelerate.

First of all, the control example of power-on downshift will be explained with reference to FIG. 6. When the driver depresses the accelerator pedal 26 deeply, the throttle opening degree abruptly increased. The AT-ECU 70 judges such abrupt change as driver's intent of power-on downshift. Thus, the AT-ECU 70 outputs a shift command instructing the downshift operation. At timing t0, the hydraulic pressure command value of a to-be-disengaged clutch is reduced stepwise to an initial hydraulic pressure. Then, the hydraulic pressure command value of this to-be-disengaged clutch linearly decreases at a constant gradient. With this control, the engagement force of the to-be-disengaged clutch decreases and the engine load decreases. Thus, the input shaft rotational speed Nt of the speed change gear mechanism 55 (i.e. output shaft rotational speed of torque converter 52) starts increasing.

Furthermore, to bring a to-be-engaged clutch into a condition ready for generating an engagement force at the timing t0 at which the downshift command is issued, the hydraulic pressure command value of this to-be-engaged clutch is set to a predetermined charging hydraulic pressure Po. This control is referred to as charging control for charging the hydraulic fluid into the to-be-engaged clutch. This charging control continues for a predetermined time tF. The to-be-engaged clutch is brought into the condition ready for generating an engagement force at timing t1. Then, the hydraulic pressure command value of the to-be-engaged clutch is dropped to a predetermined stand-by hydraulic pressure PtAp to terminate the charging control. After that, this stand-by hydraulic pressure PtAp holds the to-be-engaged clutch in a condition ready for generating an engagement force. The stand-by hydraulic pressure PtAp is set to be equal to or near a hydraulic pressure PsAp equivalent to a set load of a return spring of the to-be-engaged clutch.

Subsequently, at timing t2, the input shaft rotational speed Nt increasing quickly (i.e. change rate of Ne≧judgment value) is detected. From this moment, the hydraulic pressure of the to-be-disengaged clutch is feedback controlled so that the input shaft rotational speed Nt increases at a predetermined gradient. During this feedback control, the hydraulic pressure command value of the to-be-disengaged clutch is slightly higher that the hydraulic pressure PsDr equivalent to the set load of the return spring. Then, at timing t3, a shift change progression rate SftR reaches a predetermined value B. The shift change progression rate SftR can be expressed by the following equation.

SftR=100×(input shaft rotational speed Nt−output shaft rotational speed No×pre-shift gear ratio)/(output shaft rotational speed No×post-shift gear ratio−output shaft rotational speed No×pre-shift gear ratio The control begins to increase the hydraulic pressure command value of the to-be-engaged clutch at a constant gradient. Subsequently, at timing t4, the shift change progression rate SftR reaches a predetermined value A. From this moment, the hydraulic pressure command value of the to-be-disengaged clutch starts decreasing at a constant gradient.

Then, timing t5, the shift change progression rate SftR reaches a predetermined value C. At this moment, the hydraulic pressure command value of the to-be-engaged clutch is set to a maximum pressure to cause the hydraulic pressure of the to-be-engaged clutch to increase up to a maximum pressure. With this control, the downshift operation is accomplished by increasing the engagement force of the to-be-engaged clutch so as to agree with the timing the input shaft rotational speed Nt can be equalized with a rotational speed of a target low-speed gear stage.

Next, the control example of the ETC cooperative downshift will be explained with reference to FIG. 7. At timing t0, ETC cooperative downshift executing conditions are established and a downshift command is produced. The hydraulic pressure command value of a to-be-disengaged clutch is immediately reduced to a minimum hydraulic pressure (0 kPa) or its vicinity. Accordingly, the hydraulic pressure of a to-be-disengaged clutch is quickly reduced to a hydraulic pressure level equivalent to a transmission torque capacity.

The hydraulic pressure control of the to-be-engaged clutch performed in this ETC cooperative downshift is substantially the same as that performed in the power-on downshift. When the downshift command is produced at timing t0, the hydraulic pressure command value of the to-be-engaged clutch is set to a predetermined charging hydraulic pressure Po. A charging control is then executed to charge hydraulic fluid into the to-be-engaged clutch. This charging control continues for a predetermined time tF until the to-be-engaged clutch is brought into a condition ready for generating an engagement force. Then, the hydraulic pressure command value of the to-be-engaged clutch is dropped to a stand-by hydraulic pressure PtAp (that is near a hydraulic pressure PsAp equivalent to a set load of a return spring of the to-be-engaged clutch). Then, the charging control is terminated. After that, the stand-by hydraulic pressure PtAp holds the to-be-engaged clutch to have an engagement force capable of generating a desired engine brake. A later-performed pressure increasing control is substantially the same as the processing executed in the above-described power-on downshift.

The ETC cooperative downshift is characterized in that the engine output increasing control is executed in the following manner. In a process of decreasing an actual hydraulic pressure of the to-be-disengaged clutch to a minimum hydraulic pressure (0), the transmission torque capacity of the to-be-disengaged clutch decreases and the input shaft rotational speed Nt of the speed change gear mechanism 55 decreases. Accordingly, at timing t6, a reduction amount ΔNt in the input shaft rotational speed Nt exceeds a set value K after starting the ETC cooperative downshift control. It is judged that the hydraulic pressure of the to-be-disengaged clutch has already reduced to a hydraulic pressure level equivalent to a predetermined transmission torque capacity not causing undesirable acceleration or shock even if the engine output increasing control is started. Thus, the engine output increasing control begins at this moment.

In this case, a throttle opening degree command value is set to a predetermined throttle opening command value before starting a throttle opening control. A fuel cut flag (hereinafter, referred to as "F/C flag") is set to OFF before starting a fuel injection restoring control. Then, the fuel injection is restarted.

After starting this engine output increasing control (i.e. both of the throttle opening control and the fuel injection restoring control), the engine output increases with a predetermined delay time. Such delay in the increase of engine output is caused by a response delay (Ta) of the throttle valve 15 opening in the throttle opening control, a response delay (Tb) of the engine output increasing after the throttle valve 15 is actually opened, and a response delay (Tc) of the engine output increasing after restarting the fuel injection in the fuel injection restoring control.

After starting this throttle opening control (i.e. engine output increasing control), a throttle opening command value being set to realize the behavior of input shaft rotational speed Nt capable of attaining a desired shift time and bringing comfortable shift feeling is produced and held. This throttle opening command value is set based on desired shift time, friction loss of engine 11, and detection results of various parameters giving effects on change of input shaft rotational speed Nt (such as shift pattern [gear ratio change], cooling water temperature, input shaft rotational speed Nt, etc). Furthermore, changing the throttle opening command value with reference to the road surface gradient or deceleration of the vehicle will make it possible to accurately adjust the feeling. Furthermore, the throttle opening command value is correctable based on the output of the air flow meter 14. After starting this engine output increasing control, the input shaft rotational speed Nt of speed change gear mechanism 55 (i.e. output shaft rotational speed of the torque converter 52) start increasing.

During this engine output increasing control, the engine output increase amount is held at a predetermined amount. While a termination judgment is executed to stop the actual engine output increasing at the timing the downshift is finally terminated (i.e. the timing the shift change progression rate SftR becomes 100%). This termination judgment considers a response delay based on the shift change progression rate SftR and a change amount ΔSftR of this shift change progression rate per unit time AT during a period from issuance of the termination command to actual increase in the engine output. This termination judgment includes a step of calculating the shift change progression rate SftR (i.e. control termination timing) at which this response delay can be cancelled. Furthermore, the termination judgment includes a step of judging whether or not the shift change progression rate SftR exceeds this calculated value to obtain termination timing (t8, t9) of the throttle opening control and the fuel injection restoring control in the engine output increasing control. When the termination timing (t8, t9) is obtained as judgment results, the termination control is executed so that the throttle opening command value is reduced to "0" in the throttle opening control. According to this termination control, the throttle opening control command value decreases to "0" at a predetermined gradient as transitional reproduction of an electronic throttle is assured. Furthermore, according to the fuel injection restoring control, the F/C flag turns to ON according to the termination judgment and the fuel cut operation restarts. However, the fuel cut request from the engine 11 may disappear due to abrupt reduction in the engine rotational speed or other reasons. In such a case, the above control can be skipped.

Engine output increase termination response delay is caused by a response delay (Td) of the throttle valve 15 moving to a fully closed position in the throttle opening control, a response delay (Te) of the engine output that actually stops increasing after the throttle valve 15 is actually closed to the fully closed position, and a time (Tsd) required for the throttle opening command value to decrease to "0" after issuance of the termination judgment, as well as a response delay (Tf) of the engine output that becomes 0 after restarting the fuel cut operation in the fuel injection restoring control.

The response delay (Td) of the throttle valve 15 in the valve closing action can be calculated by using a map of parameters (cooling water temperature, battery voltage, or the like) that are related to driving response of the motor 17 in the electronic throttle system. Furthermore, the response delay (Te) of the engine output that actually stops increasing after the throttle valve 15 is actually closed to the fully closed position can be calculated by using a map of parameters (engine rotational speed, throttle opening degree, or the like) that are related to intake air flow speed as well as a delay in combustion of the intake air that is choked by the fully-closing action of the throttle valve 15 before it is introduced into the cylinder. Furthermore, the time (Tsd) required for the throttle opening command value to decrease to "0" after issuance of the termination judgment can be calculated based on the throttle opening command value/attenuation gradient. Furthermore, the response delay (Tf) of the engine output that becomes 0 after restarting the fuel cut operation can be set based on a time required for the cylinder to reach a combustion stroke (i.e. time T720° CA required for the crank shaft to rotate 720° CA) after restarting the fuel cut operation.

The shift change control of the above-described first embodiment is carried out cooperatively by the AT-ECU 70 and the engine ECU 25 in accordance with the following routines.

Shift Change Control

Figure 8:
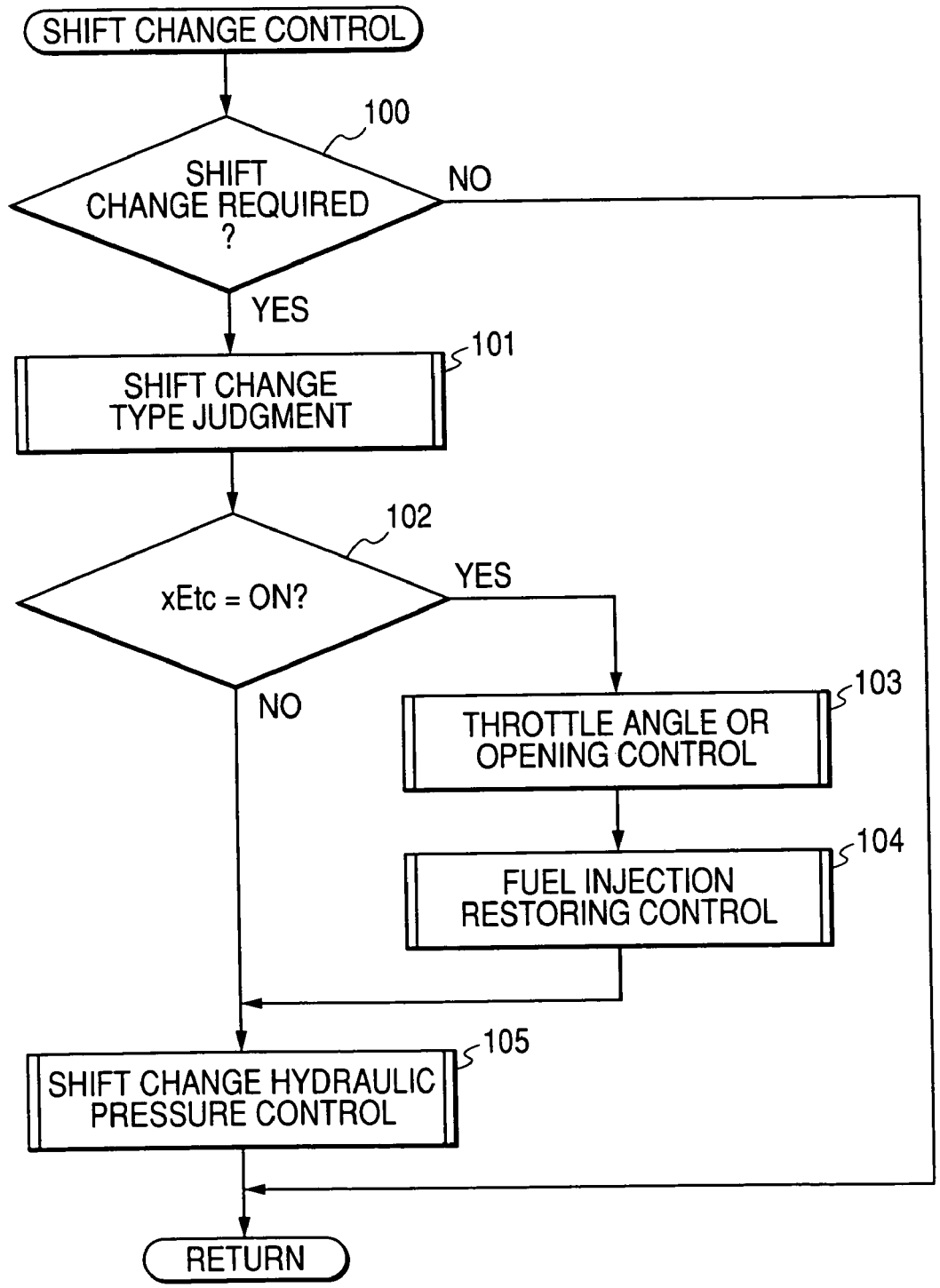
FIG. 8 is a flowchart showing processing flow of a shift change control routine in accordance with the first embodiment of the present invention.

FIG. 8 is a main routine of the shift control executed at predetermined time intervals during the engine is operating (for example, at the intervals of 8 to 32 msec). When this routine starts, a judgment is made in step 100 as to whether any shift change is required (i.e. whether any shift command is produced). If no shift change is required, this routine terminates without executing the following processing.

On the other hand, if any shift change is required, the control procedure proceeds to step 101 to execute a shift change type judging routine that is later described with reference to FIG. 9, to judge a shift change type corresponding to the present shift command. Then, the control flow proceeds to step 102 to judge whether or not an ETC cooperative downshift execution flag xEtc is set to ON. The ETC cooperative downshift execution flag xEtc becomes ON when ETC cooperative downshift executing conditions are established. When the ETC cooperative downshift execution flag xEtc is set to OFF, the control flow proceeds to step 105 to execute a shift change hydraulic pressure control routine (not shown) in accordance with the shift change type. Thus, the transmission is shifted to a gear stage corresponding to the present shift command. And, this routine ends at this moment.

On the other hand, when the ETC cooperative downshift execution flag xEtc is set to ON, it is considered that the ETC cooperative downshift executing conditions are established. Then, the control flow proceeds from step 102 to step 103 to start a throttle opening control routine that is later described with reference to FIG. 13 to execute a throttle opening control. Then, the control flow proceeds to step 104 to start a fuel injection restoring control routine that is later described with reference to FIG. 19 to execute a fuel injection restoring control. Then, the control flow proceeds to step 105 to execute the shift change hydraulic pressure control routine that is later described with reference to FIG. 10, thereby causing the transmission to shift to a gear stage corresponding to the present shift command. And, this routine ends at this moment.

Shift Change Type Judgment

Figure 9:
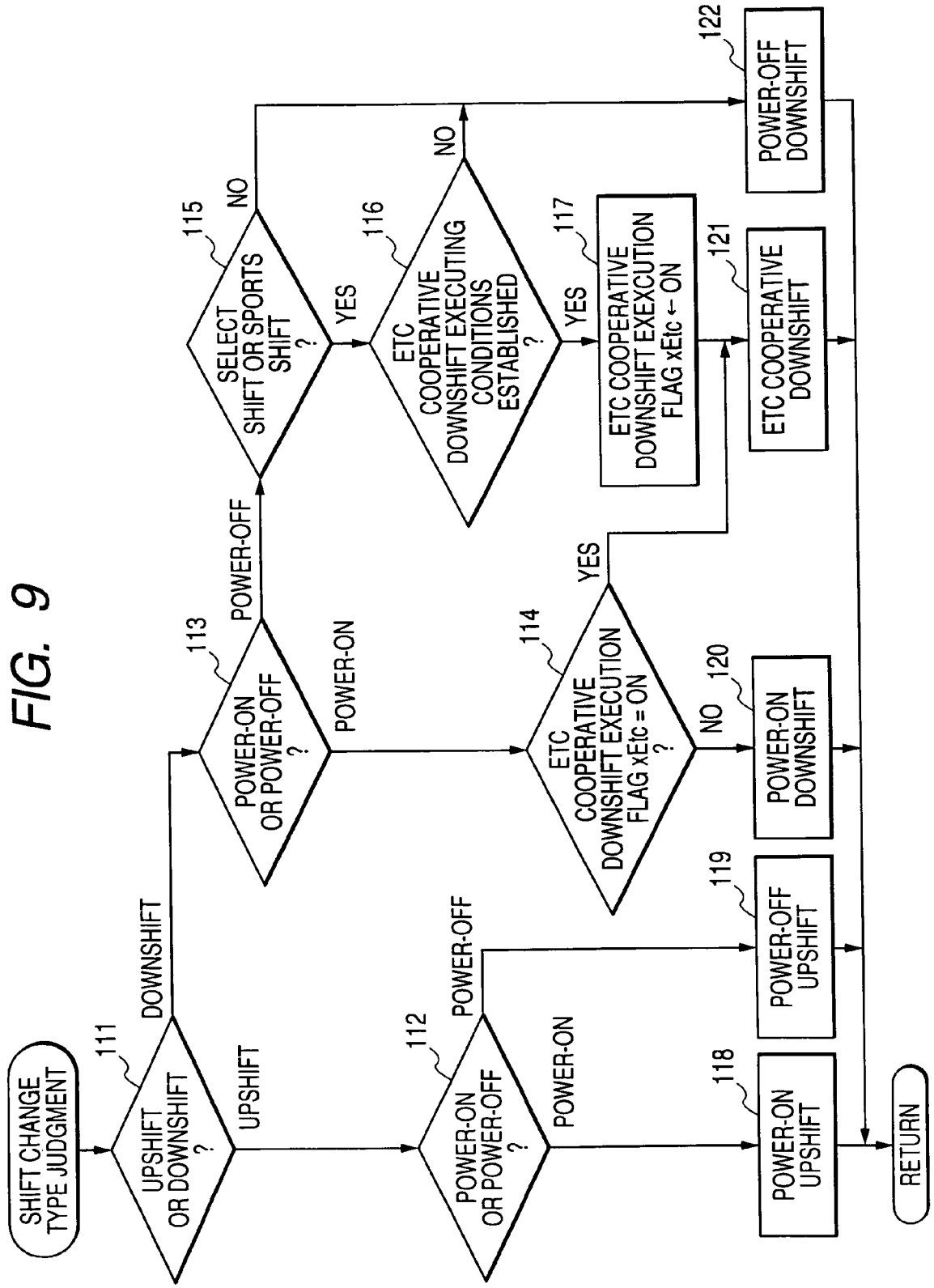
FIG. 9 is a flowchart showing processing flow of a shift change type judging routine in accordance with the first embodiment of the present invention.

FIG. 9 shows a shift change type judging routine that is a sub routine executed in the step 101 of the shift change control routine shown in FIG. 8. When this routine starts, a judgment is made in step 111 whether or not the present shift command is upshift or downshift. When the judgment result is upshift, the control flow proceeds to step 112 to further judge whether a load condition applied to the automatic transmission 51 is power-on (i.e. the condition the automatic transmission 51 is driven by the engine 11) or power-off (i.e. the condition the automatic transmission 51 is driven by the driving wheels). Then, according to this judgment result, the shift change type according to the present shift command is identified as power-on upshift (in step 118) or as power-off upshift (in step 119).

On the other hand, when the judgment result in step 111 is downshift, the control flow proceeds to step 113 to further judge whether the load condition applied to the automatic transmission 51 is power-on or power-off. When the judgment result is power-off, it is further judged whether or not this downshift is executed based on driver's intent to decelerate. According to this embodiment, a select shift or a sports shift are regarded as the downshift performed according to driver's intent to decelerate. The select shift is a shift performed when the shift lever 16 is operated. The sports shift is a shift performed when a switch on a steering wheel is depressed in a manual mode or when the shift lever 16 is operated. When the judgment result is downshift based on driver's intent to decelerate, the control flow proceeds to step 116 to further judge whether or not the ETC cooperative downshift executing conditions are established. For example, to assure controllability, it is judged whether or not the oil temperature of hydraulic fluid is in a temperature region showing good reproduction of hydraulic pressure relative to a hydraulic pressure command value. When the result shows the establishment of the ETC cooperative downshift executing conditions, the control flow proceeds to step 117 to set the ETC cooperative downshift execution flag xEtc to ON. Then, the control flow proceeds to step 121 to identify the type of present shift change as ETC cooperative downshift.

Furthermore, when the result of step 115 is not the downshift based on driver's intent to decelerate, or when the result of step 116 shows no establishment of the ETC cooperative downshift executing conditions, the control flow proceeds to step 122 to identify the type of present shift change as power-off downshift.

On the other hand, when the judgment of step 113 is power-on, the control flow proceeds to step 114 to discriminate the power-on based on the ETC cooperative downshift control (i.e. engine output increasing control) from the power-on based on depression of the accelerator pedal 26. To this end, a judgment is made in step 114 as to whether or not the ETC cooperative downshift execution flag xEtc is set to ON. When the judgment result is ON, the control flow proceeds to step 121 to identify the type of present shift change as ETC cooperative downshift. When the ETC cooperative downshift execution flag xEtc is OFF, the control flow proceeds to step 120 to identify the type of present shift change as power-on downshift.

Shift Change Hydraulic Pressure Control

Figure 10:
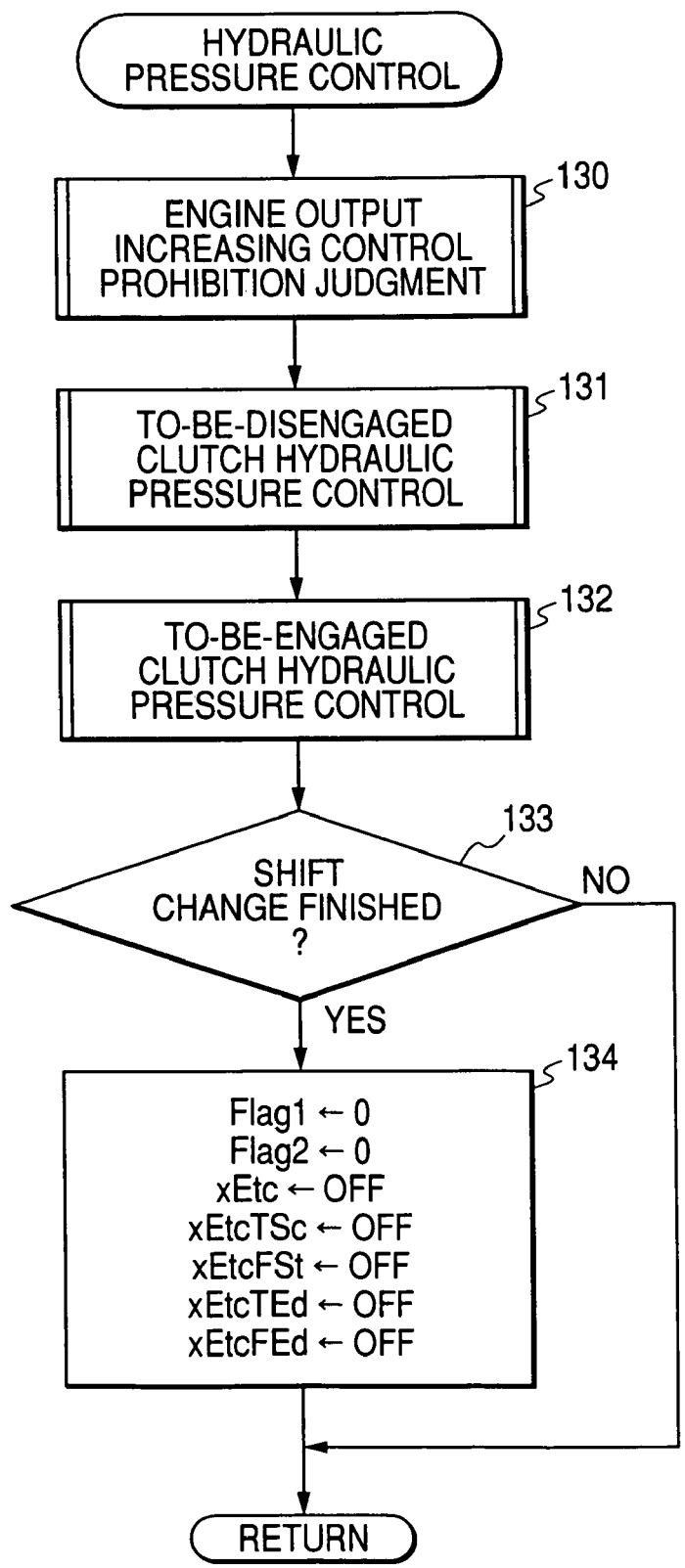
FIG. 10 is a flowchart showing processing flow of a shift change hydraulic pressure control routine in accordance with the first embodiment of the present invention.

FIG. 10 shows a shift change hydraulic pressure control routine that is executed when the shift change type is ETC cooperative downshift. The shift change hydraulic pressure control routine shows the function of the claimed downshift control means of the present invention. When this routine starts, in step 130, an engine output increasing control prohibition judging routine is executed as shown in later-described FIG. 18. After the presence of prohibition is judged with respect to the engine output increasing control, the control flow proceeds to step 131 to execute a to-be-disengaged clutch hydraulic pressure control routine as shown in later-described FIG. 11 to control the hydraulic pressure of the to-be-disengaged clutch. Then, in the next step 132, a to-be-engaged clutch hydraulic pressure control routine is executed as shown in later-described FIG. 12 to control the hydraulic pressure of the to-be-engaged clutch.

Then, the control flow proceeds to step 133 to judge whether or not the downshift operation is accomplished. According to this embodiment, accomplishment of the downshift operation is confirmed when later-described control phase flag Flag 1=4 and Flag 2=5. After the downshift operation is accomplished, the control flow proceeds to step 134 to reset the control phase flags Flag 1 and Flag 2 to initial value '0' and also reset other flags xEtc, xEtcTSt, xEtcFSt, xEtcTEd, and xEtcFEd to 'OFF' before this routine ends.

To-be-disengaged Clutch Hydraulic Pressure Control

Figure 11:
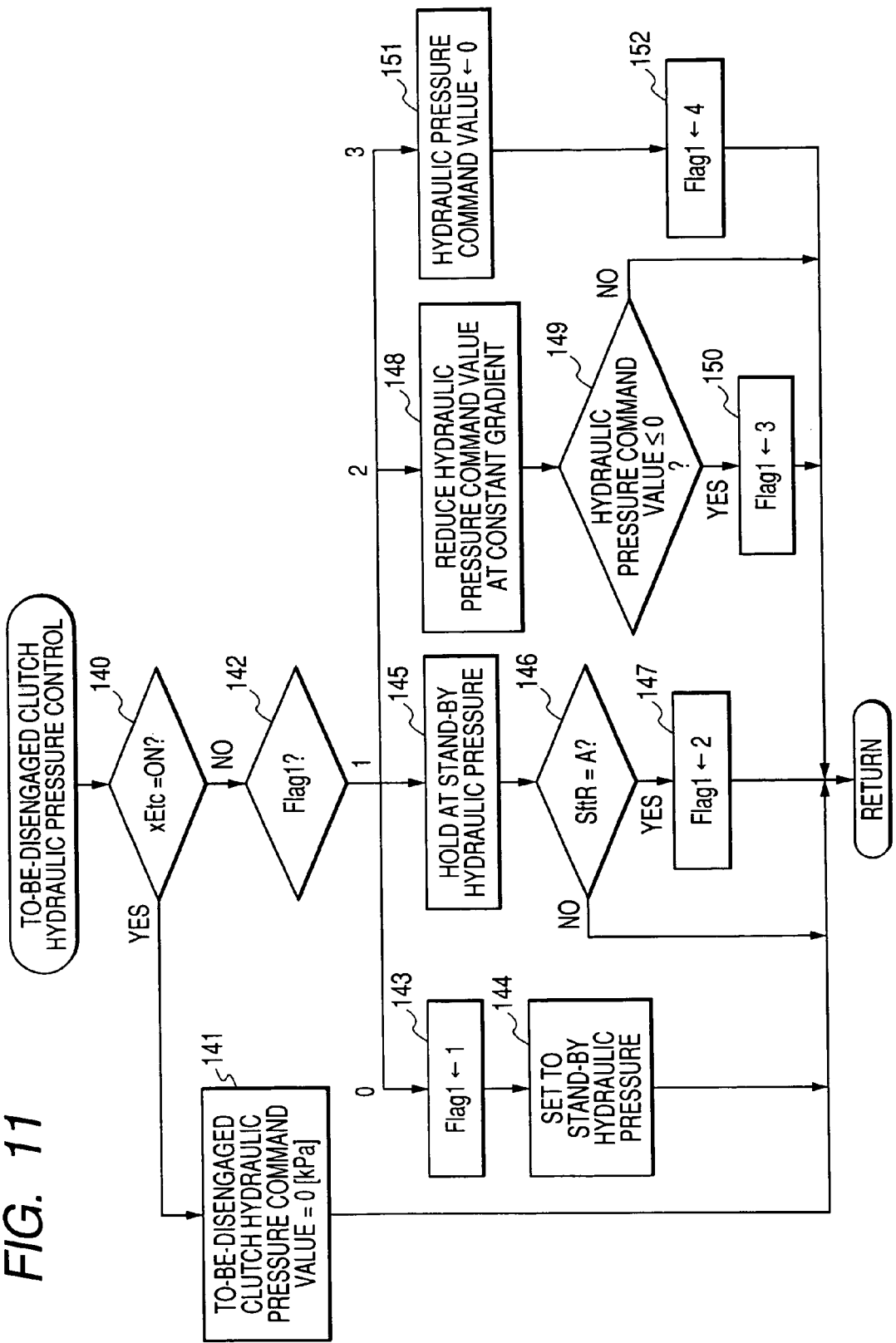
FIG. 11 is a flowchart showing processing flow of a to-be-disengaged clutch hydraulic pressure control routine in accordance with the first embodiment of the present invention.

Next, the processing contents of the to-be-disengaged clutch hydraulic pressure control routine executed in the step 131 of the shift change hydraulic pressure control routine of FIG. 10 will be explained with reference to a flowchart of FIG. 11. When this routine starts, it is judged in step 140 as to whether or not the ETC cooperative downshift execution flag xEtc is set to ON. In other words, it is judged whether or not the type of present shift change is ETC cooperative downshift. When the ETC cooperative downshift execution flag xEtc is ON, the control flow proceeds to step 141 to immediately reduce the hydraulic pressure command value of the to-be-disengaged clutch to a minimum hydraulic pressure, i.e. 0 kPa, (refer to FIG. 7). The processing of this step 141 shows the function of the claimed downshift control means of the present invention.

On the other hand, when the judgment result of step 140 shows that the ETC cooperative downshift execution flag xEtc is OFF, the control flow proceeds to step 142 to further judge whether or not the control phase flag Flag 1 has a value of 0 to 3 to identify the present phase of the to-be-disengaged clutch hydraulic pressure control. The control phase flag Flag 1 increments by 1 each time the to-be-disengaged clutch hydraulic pressure control advances to the next phase. An initial value of Flag 1 is 0 and a maximum value is 4. Accordingly, the to-be-disengaged clutch hydraulic pressure control is a sequence control consisting of four phases.

The control phase flag Flag 1 is set to its initial value (=0) at the timing t0 the to-be-disengaged clutch hydraulic pressure control is started. Accordingly, the control flow proceeds to step 143 to set the control phase flag Flag 1 to "1" and then proceeds to the next step 144 to set the hydraulic pressure command value of the to-be-disengaged clutch to the standby hydraulic pressure PtDr. Thus, the hydraulic pressure supplied to the to-be-disengaged clutch is reduced to this stand-by hydraulic pressure PtDr (i.e. first phase control).

When this routine starts next time, the control phase flag is already set to 1 (i.e. Flag 1=1). Thus, the control flow proceeds to step 145 to hold the hydraulic pressure of the to-be-disengaged clutch at the stand-by hydraulic pressure PtDr and then proceeds to the next step 146 to further judge whether or not the shift change progression rate SftR has reached the predetermined value A that is close to 100%. When the shift change progression rate SftR has not reached the predetermined value A yet, this routine ends at this moment. Subsequently, at the timing the shift change progression rate SftR reaches the predetermined value A, the control flow proceeds to step 147 to set the control phase flag Flag 1 to '2' before terminating this second phase control and shifting to a third phase control.

According to the third phase control, first in step 148, the hydraulic pressure command value of the to-be-disengaged clutch is reduced at a constant gradient. Then, in the next step 149, it is judged whether or not the hydraulic pressure command value of the to-be-disengaged clutch has reduced to 0 or less. This third phase control (i.e. hydraulic pressure decreasing control) continues until the hydraulic pressure command value of the to-be-disengaged clutch decreases to 0. Subsequently, at the timing the hydraulic pressure command value of the to-be-disengaged clutch decreases to a minimum value (=0 or less), the control flow proceeds to step 150 to set the control phase flag Flag 1 to '3' before terminating this third phase control and shifting to a fourth phase control.

According to the fourth phase control, first in step 151, the hydraulic pressure command value of the to-be-disengaged clutch is set to 0 to bring the to-be-disengaged clutch into a completely disengaged condition. Then, in the next step 152, the control phase flag Flag 1 is set to '4' before terminating the to-be-disengaged clutch hydraulic pressure control.

To-be-engaged Clutch Hydraulic Pressure Control

Figure 12:
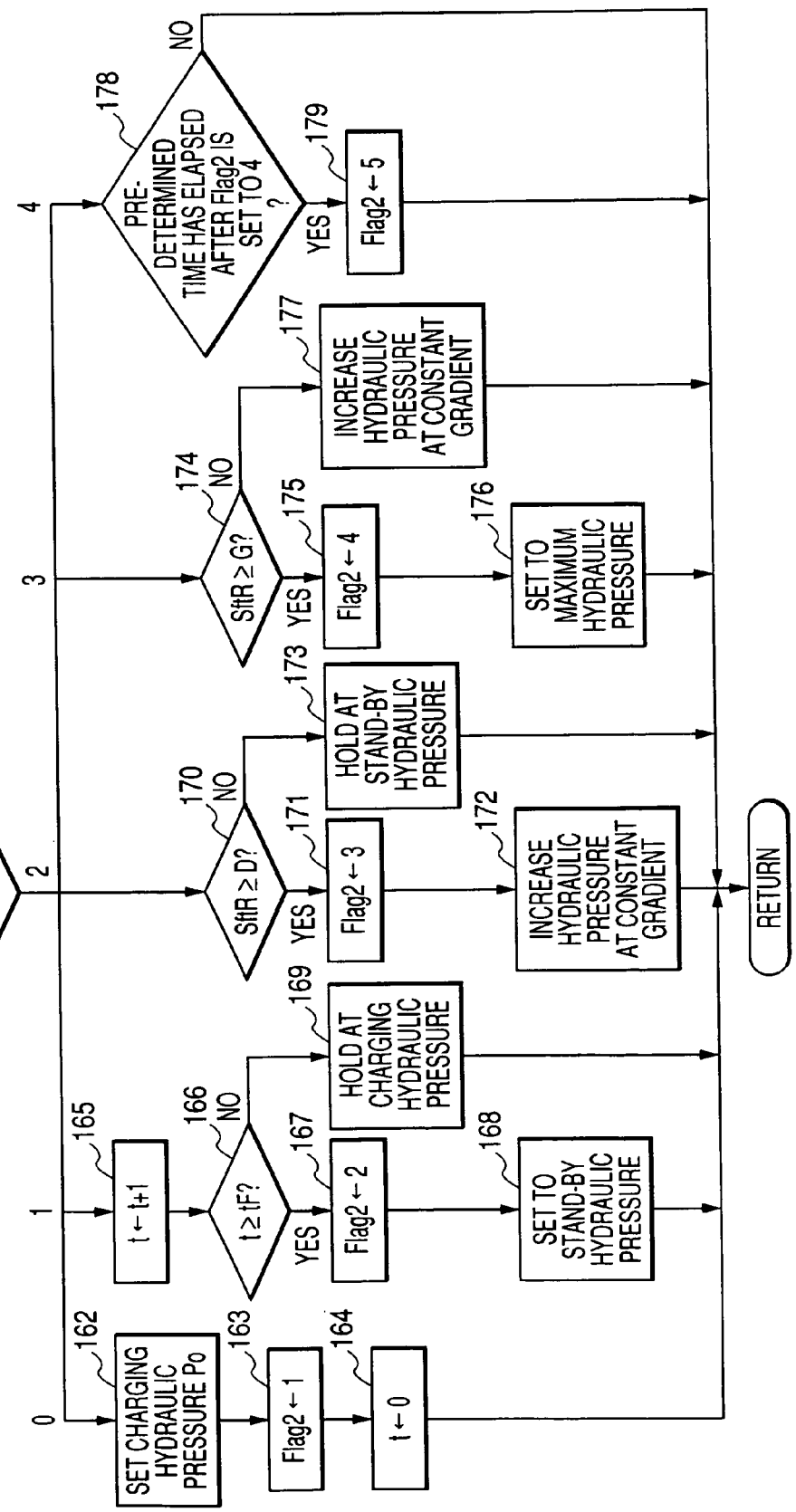
FIG. 12 is a flowchart showing processing flow of a to-be-engaged clutch hydraulic pressure control routine in accordance with the first embodiment of the present invention.

FIG. 12 shows the to-be-engaged clutch hydraulic pressure control routine that is a sub routine executed in the step 132 of the shift change hydraulic pressure control routine of FIG. 10. When this routine starts, a judgment is made in step 161 as to whether the control phase flag Flag 2 has a value of 0 to 4 to identify the present phase of the to-be-engaged clutch hydraulic pressure control. The control phase flag Flag 2 increments by 1 each time the to-be-engaged clutch hydraulic pressure control advances to the next phase. An initial value of Flag 2 is 0 and a maximum value is 5. Accordingly, the to-be-engaged clutch hydraulic pressure control is a sequence control consisting of five phases.

The control phase flag Flag 2 is set to its initial value (=0) at the timing t0 the to-be-engaged clutch hydraulic pressure control is started. Accordingly, the control flow proceeds to step 162 to set the hydraulic pressure command value of the to-be-engaged clutch to a predetermined charging hydraulic pressure Po so that the to-be-engaged clutch is brought into a condition ready for generating an engagement force. And, the charging control is executed to charge hydraulic fluid to the to-be-engaged clutch. Then, in the next step 163, the control phase flag Flag 2 is set to '1'. Then, the control flow proceeds to step 164 to reset a timer t counting charging control time to 0 before terminate this routine.

When this routine starts next time, the control phase flag is already set to 1 (i.e. Flag 2=1). Thus, the control flow proceeds to step 165 to count up the charging control time timer t to count the charging control time. In the next step 166, a judgment is made as to whether or not the present value of the charging control time timer t is equal to or greater than a predetermined time tF. Until the charging control time reaches the predetermined time tF, the hydraulic pressure command value of the to-be-engaged clutch is held at the charging hydraulic pressure Po and the charging control continues (refer to step 169).

The predetermined time tF is the time required to bring the to-be-engaged clutch into a condition ready for generating for an engagement force in the charging control. The time tF can be set beforehand based on experiments or simulations.

Subsequently, at the timing the charging control time reaches the predetermined time tF (i.e. the timing the to-be-engaged is ready for generating an engagement force in the charging control), the control flow proceeds to step 167 to set the control phase flag Flag 2 to '2'. And then, in the next step 168, the hydraulic pressure command value of the to-be-engaged clutch is reduced to the stand-by hydraulic pressure PtAp and the charging control is terminated. After that, the stand-by hydraulic pressure PtAp holds the to-be-engaged clutch into the condition ready for generating an engagement force.

When the hydraulic pressure of the to-be-engaged clutch is maintained at the stand-by hydraulic pressure PtAp, the control phase flag Flag 2 is set to '2'. Thus, the control flow proceeds to step 170 to judge whether or not the shift change progression rate SftR has reached a predetermined value D (refer to FIG. 7). Before the shift change progression rate SftR reaches this predetermined value D, the hydraulic pressure command value of the to-be-engaged clutch is held at the stand-by hydraulic pressure PtAp (step 173).

Subsequently, at the timing the shift change progression rate SftR reaches the predetermined value D, the control flow proceeds to step 171 to set the control phase flag Flag 2 to '3'. Then, in the next step 172, the hydraulic pressure command value of the to-be-engaged clutch increases at a constant gradient.

Subsequently, as the control phase flag Flag 2 is '3' when this routine starts again, the control flow proceeds to step 174 to judge whether or not the shift change progression rate SftR has reached the predetermined value G that is close to 100%. Before the shift change progression rate SftR reaches the predetermined value G, the hydraulic pressure command value of the to-be-engaged clutch continuously increases at a constant gradient (step 177).

Subsequently, at the timing the shift change progression rate SftR reaches the predetermined value G, the control flow proceeds to step 175 to set the control phase flag Flag 2 to '4'. Then, in the next step 176, the hydraulic pressure command value of the to-be-engaged clutch is set to a maximum pressure to increase the hydraulic pressure of the to-be-engaged clutch to the maximum pressure. With this control, the downshift operation is accomplished by increasing the engagement force of the to-be-engaged clutch so as to agree with the timing the input shaft rotational speed Nt can be equalized with a rotational speed of a target low-speed gear stage.

After that, the control phase flag Flag 2 is '4' when this routine starts again, the control flow proceeds to step 178 to judge whether or not a predetermined time has elapsed after the control phase flag Flag 2 is set to '4' (i.e. whether or not a predetermined time has elapsed after the shift change progression rate SftR has reached the predetermined value G). At the timing the predetermined time has elapsed, the control flow proceeds to step 179 to set the control phase flag Flag 2 to '5' before terminating the to-be-engaged clutch hydraulic pressure control.

Throttle Opening Control

Figure 13:
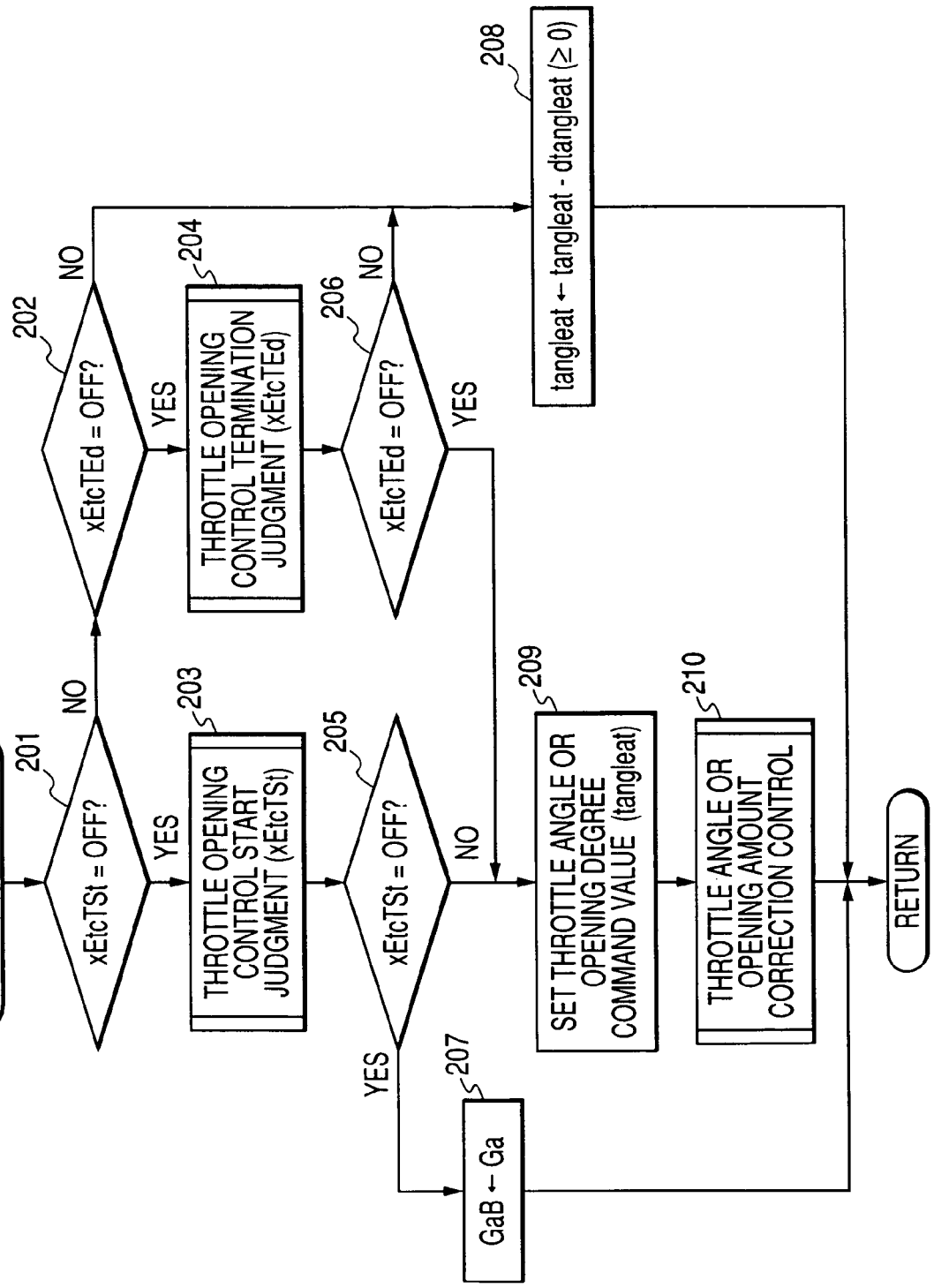
FIG. 13 is a flowchart showing processing flow of a throttle opening control routine in accordance with the first embodiment of the present invention.

FIG. 13 shows a throttle opening control routine that is a sub routine executed in the step 103 of the shift change control routine shown in FIG. 8. This throttle opening control routine shows the function of the claimed engine output increasing means of the present invention.

When this routine starts, a judgment is made in step 201 as to whether or not a throttle opening control start flag xEtcTSt is OFF. When this flag xEtcTSt is OFF, it means that the throttle opening control is not started yet. When the judgment result is YES, the control flow proceeds to step 203 to execute a throttle opening control start judging routine shown in a later-described FIG. 14 to judge the start timing of the throttle opening control. This judgment result is used to determine set/reset of the throttle opening control start flag xEtcTSt.

Then, the control flow proceeds to step 205 to judge whether or not the throttle opening control start flag xEtcTSt is in OFF state. When the flag xEtcTSt is OFF, the control flow proceeds to step 207 to renew the intake air amount value GaB memorized before starting the throttle opening control with a present value Ga detected by the air flow meter 14. Then, this routine ends at this moment.

On the other hand, when the judgment result of step 205 shows that the throttle opening control start flag xEtcTSt is ON, the control flow proceeds to step 209 to set a throttle opening degree command value tangleat (i.e. throttle opening amount) by using a throttle opening amount setting map shown in FIG. 17 with reference to a target gear stage in the downshift operation, water temperature, and the input shaft rotational speed Nt. Then, the control flow proceeds to step 210 to execute a throttle opening amount correction control routine shown in a later-described FIG. 16. Then, this routine ends at this moment.

Furthermore, when the judgment result of step 201 shows that throttle opening control start flag xEtcTSt is ON (i.e. the throttle opening control is currently progressing), the control flow proceeds to step 202 to further judge whether or not a throttle opening control termination flag xEtcTEd is OFF. When this flag xEtcTEd is OFF, it means that the throttle opening control is not terminated yet. When the judgment result is OFF, the control flow proceeds to step 204 to execute a throttle opening control termination judging routine shown in a later-described FIG. 15 to judge the termination timing of the throttle opening control. This judgment result is used to determine set/reset of the throttle opening control termination flag xEtcTEd.

Then, the control flow proceeds to step 206 to further judge whether or not the throttle opening control termination flag xEtcTEd is in OFF state. When the judgment result is OFF, the above-described processing of steps 209 and 210 is executed and the throttle opening control continues.

On the other hand, the judgment result of step 206 shows that the throttle opening control termination flag xEtcTEd is ON, the control flow proceeds to step 208 to execute a termination control. In this termination control, the throttle opening degree command value 'tangleat' is subtracted by a predetermined amount 'tangleat' successively so that the throttle opening command value 'tangleat' decreases at a predetermined gradient.

Throttle Opening Control Start Judgment

Figure 14:
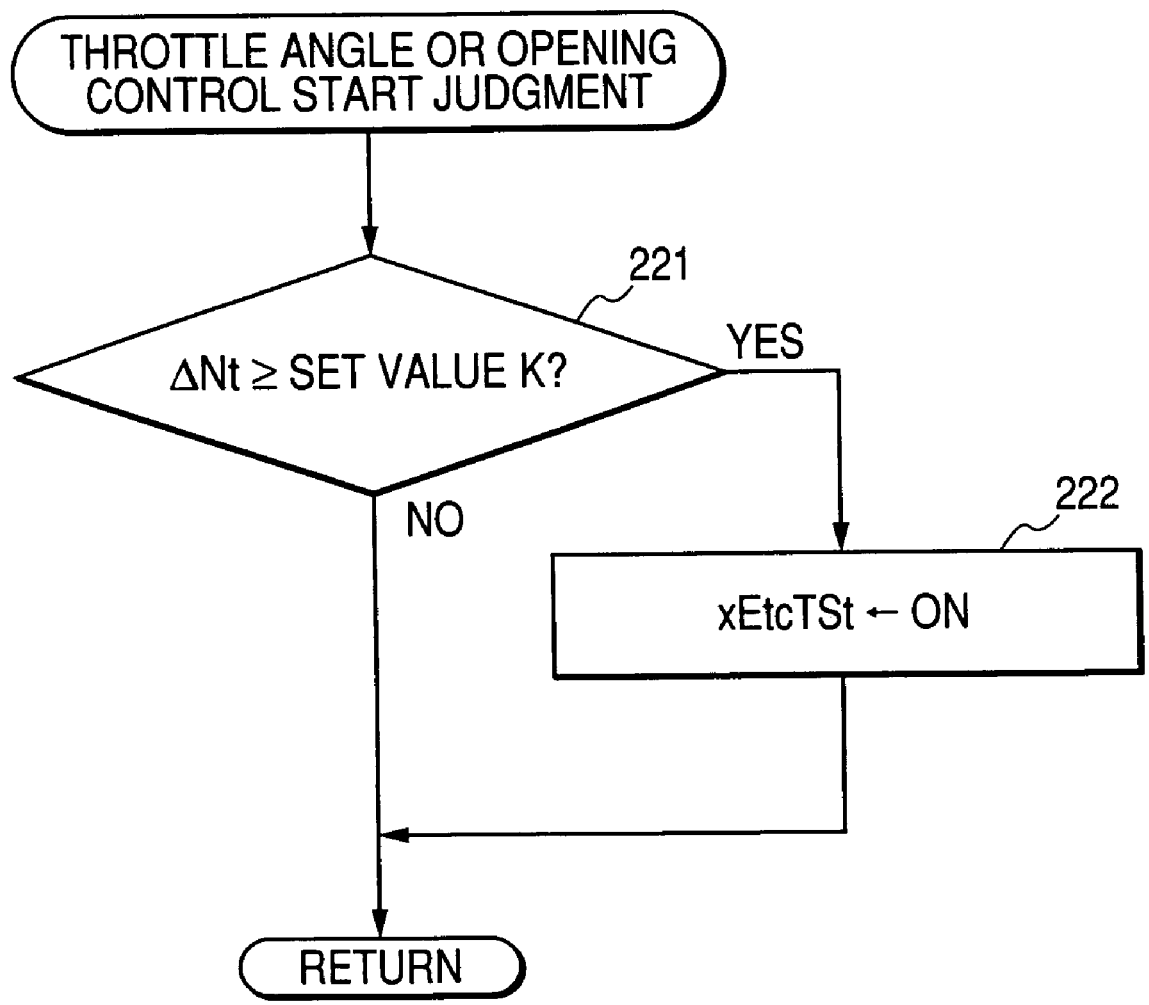
FIG. 14 is a flowchart showing processing flow of a throttle opening control start judging routine in accordance with the first embodiment of the present invention.

FIG. 14 shows the throttle opening control start judging routine that is a sub routine executed in the step 203 of the throttle opening control routine shown in FIG. 13. When this routine starts, a judgment is made in step 221 as to whether or not a reduction amount ΔNt in the input shaft rotational speed Nt has exceeded a set value K after the ETC cooperative downshift control is started. When the reduction amount ΔNt in the input shaft rotational speed Nt is smaller than the set value K, it can be concluded that the engine output increasing control should not start yet. And, this routine ends at this moment.

Subsequently, at the timing the reduction amount ΔNt in the input shaft rotational speed Nt exceeds the set value K after starting the ETC cooperative downshift control, it can be concluded that the engine output increasing control should start immediately. Thus, the control flow proceeds from step 221 to step 222 to set the throttle opening control start flag xEtcTSt to ON.

Throttle Opening Control Termination Judgment

Figure 15:
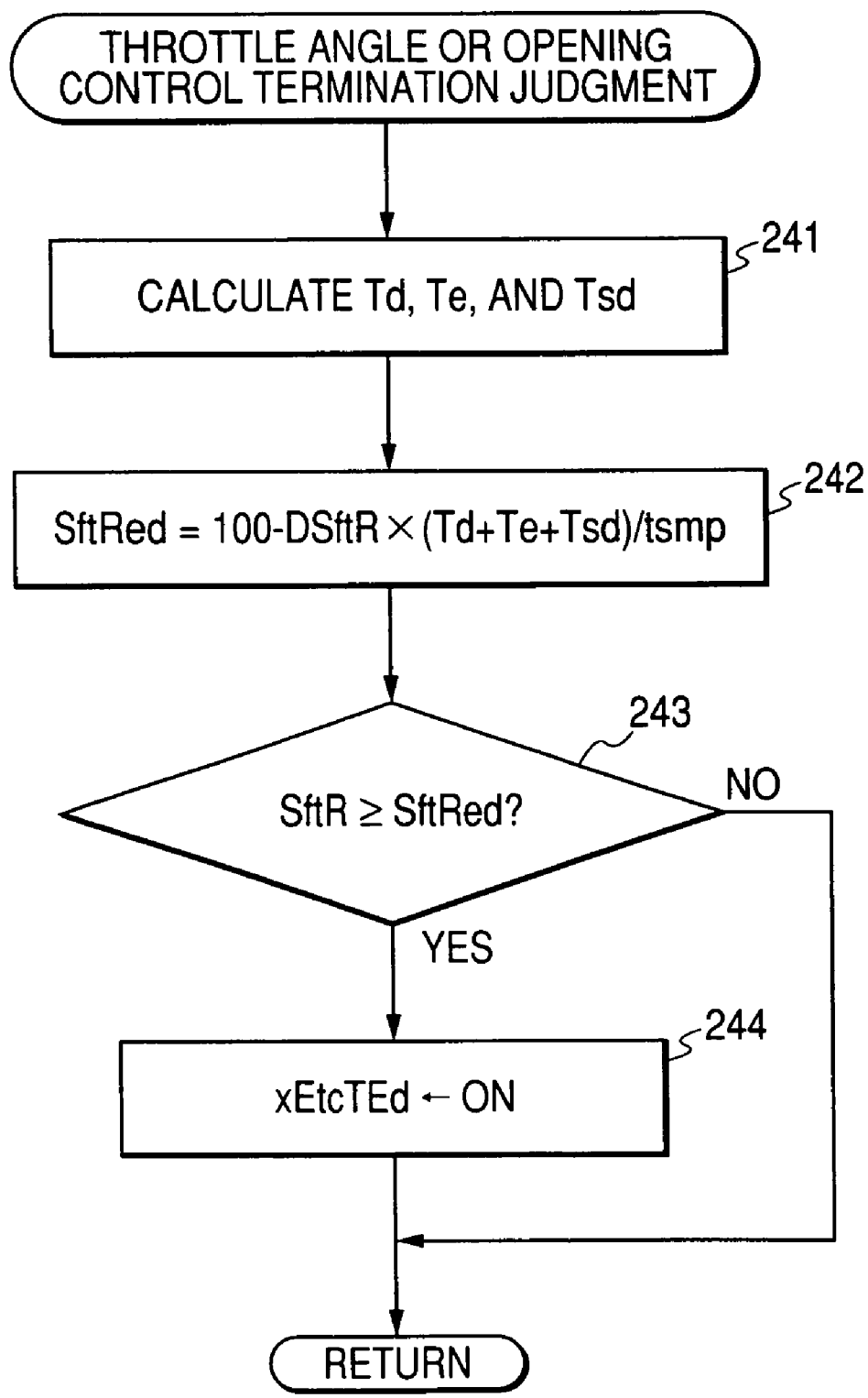
FIG. 15 is a flowchart showing processing flow of a throttle opening control termination judging routine in accordance with the first embodiment of the present invention.

FIG. 15 shows the throttle opening control termination judging routine that is a sub routine executed in the step 204 of the throttle opening control routine shown in FIG. 13. When this routine starts, in step 241, time values Td, Te, and Tsd are calculated. The time Td represents a response delay in a fully closing action of the throttle valve 15. The time Te represents a response delay in the engine output that actually stops increasing after the throttle valve 15 is actually closed to the fully closed position. Furthermore, the time Tsd represents a time required for the throttle opening command value decreasing to "0" after the termination judgment. The response delay Td in the valve closing action of the throttle valve 15 can be calculated by using a map of parameters (cooling water temperature, battery voltage, etc) that relate to driving response of the motor 17 in the electronic throttle system. Furthermore, the response delay Te in the engine output to actually stop increasing after the fully closing action of the throttle valve 15 can be calculated by using a map of parameters (engine rotational speed, throttle opening degree, etc) that relate to intake air flow speed as well as a delay in combustion of the intake air that is choked by the fully-closing action of the throttle valve 15 before it is introduced into the cylinder. Furthermore, the time Tsd required for the throttle opening command value to decrease to "0" after issuance of the termination judgment can be calculated based on the throttle opening command value/attenuation gradient.

Then, the control flow proceeds to step 242 to calculate a shift change progression rate SftRed at the termination time of the throttle opening control (i.e. at the start time the termination control) according to the following equation.

$$SftRed=100-DSftR\times(Td+Te+Tsd)/tsmp$$

where DSftR represents a change amount in the shift change progression rate SftR per calculation cycle (i.e. present SftR value−previous SftR value), and tsmp represents the calculation cycle of DSftR.

Then, the control flow proceeds to step 243 to judge whether or not the present shift change progression rate SftR is equal to or greater than the above-described value SftRed. When the shift change progression rate SftR has not reached the value SftRed yet, this routine ends at this moment. Then, at the timing the shift change progression rate SftR reaches the value SftRed, the control flow proceeds to step 244 to set the throttle opening control termination flag xEtcTEd to ON.

Throttle Opening Amount Correction Control

Figure 16:
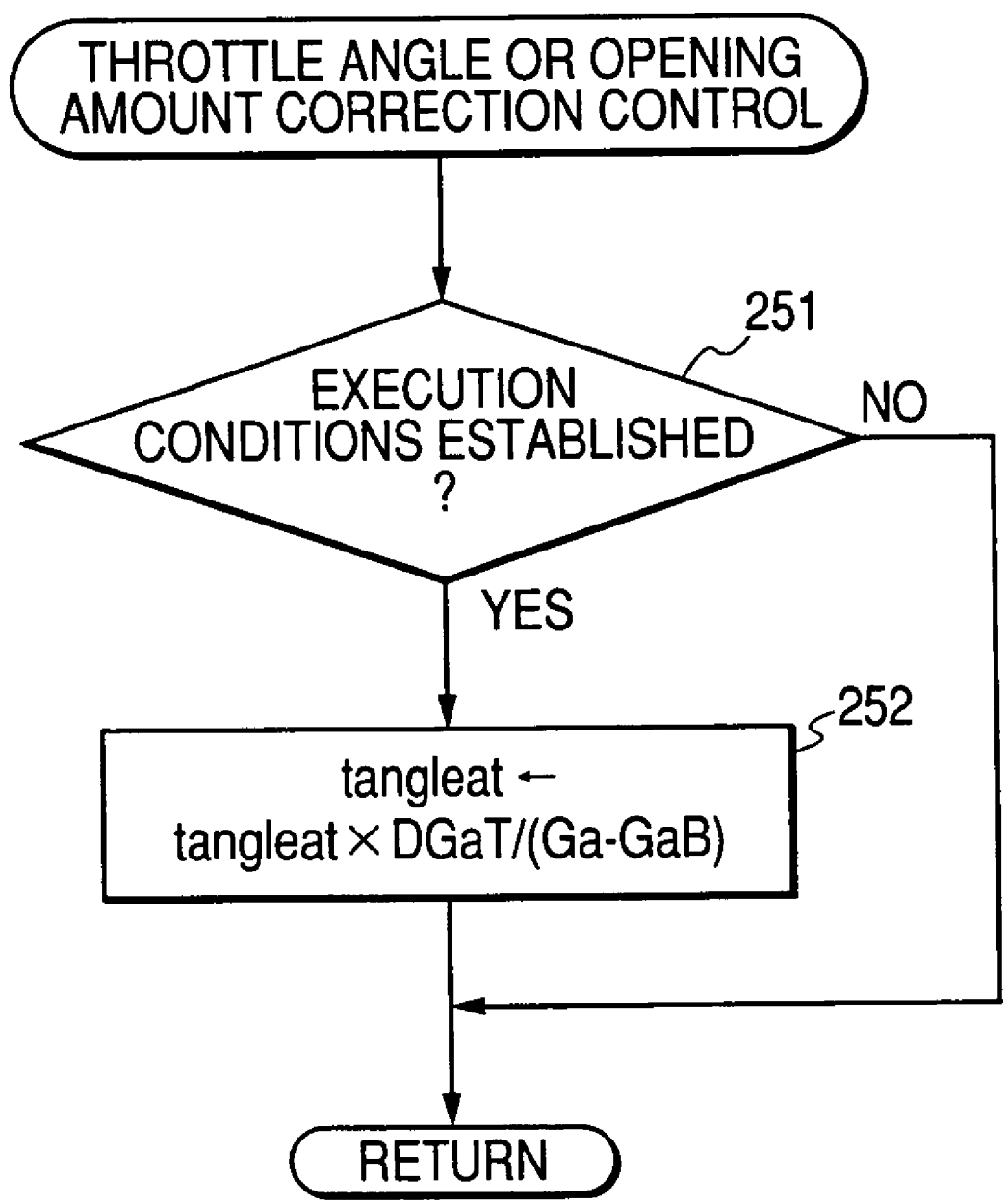
FIG. 16 is a flowchart showing processing flow of a throttle opening amount correction routine in accordance with the first embodiment of the present invention.

FIG. 16 shows the throttle opening amount correction control routine that is a sub routine executed in the step 210 of the throttle opening control routine shown in FIG. 13. When this routine starts, a judgment is made in step 251 as to whether or not execution conditions of the throttle opening amount correction control are established. Establishment of the execution conditions is judged by checking whether or not the time having elapsed after issuance of the throttle opening command exceeds a time value equivalent to the response delay. When the time having elapsed after issuance of the throttle opening command is shorter than the time value equivalent to the response delay, the execution conditions of the throttle opening amount correction control are not established yet. Hence, this routine ends at this moment. Subsequently, at the timing the time having elapsed after issuance of the throttle opening command becomes equal to or longer than the time value equivalent to the response delay, the execution conditions of the throttle opening amount correction control are already established. Thus, the control flow proceeds to step 252 to correct the throttle opening degree command value tangleat (i.e. throttle opening amount) according to the following equation.

$$tangleat = tangleat \times DGaT/(Ga-GaB)$$

The value DGaT is an increase amount target value of the intake air amount Ga in the throttle opening control, which can be set by using a table according to a throttle opening degree command value tangleat. The value GaB is an intake air amount at the timing immediately before the throttle opening control starts, which is memorized in the step 207 of the throttle opening control routine shown in FIG. 13. By correcting the throttle opening degree command value tangleat (i.e. throttle opening amount) based on the above equation, it becomes possible to correct inherent differences of the system caused by manufacturing errors, aging changes, or driving conditions including air pressure and intake air temperature.

Engine Output Increasing Control Prohibition Judgment

Figure 18:
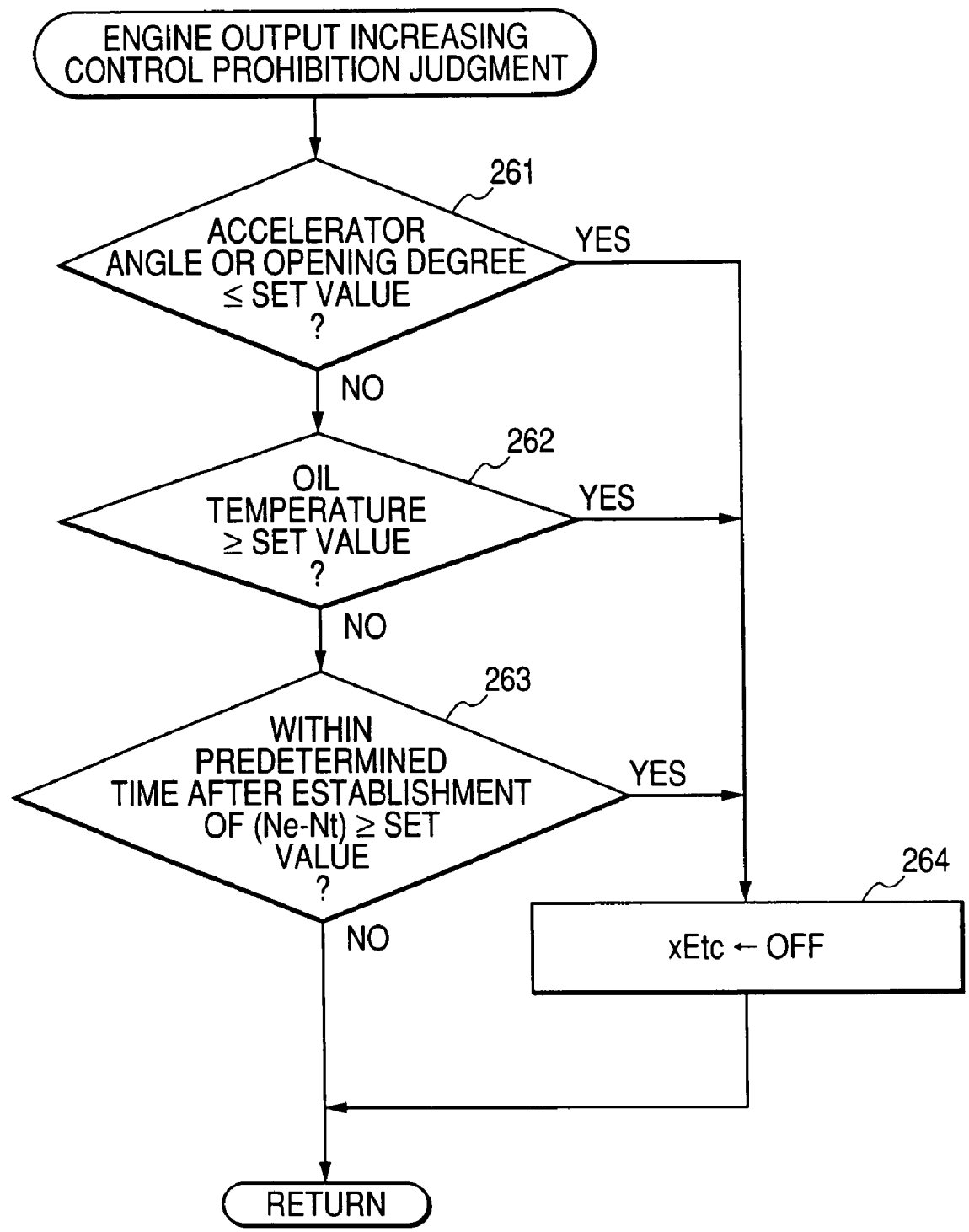
FIG. 18 is a flowchart showing processing flow of an engine output increasing control prohibition judging routine in accordance with the first embodiment of the present invention.

FIG. 18 shows the engine output increasing control prohibition judging routine that is a sub routine executed in the step 130 of the shift change hydraulic pressure control routine shown in FIG. 10. When this routine starts, a judgment is made in step 261 as to whether or not an accelerator opening degree detected by the accelerator sensor 27 is equal to or less than a set value. When the accelerator opening degree is equal to or less than the set value, the control flow proceeds to step 264 to set the ETC cooperative downshift execution flag xEtc to OFF to prohibit the engine output increasing control (i.e. both of the throttle opening control and the fuel injection restoring control).

On the other hand, when the accelerator opening degree is greater than the set value, the control flow proceeds from step 261 to step 262 to further judge whether or not the oil temperature is equal to or higher than a set value. When the oil temperature is equal to or higher than the set value, the control flow proceeds to step 264 to set the ETC cooperative downshift execution flag xEtc to OFF to prohibit the engine output increasing control (i.e. both of the throttle opening control and the fuel injection restoring control).

On the other hand, when the oil temperature is lower than the set value, the control flow proceeds from step 262 to step 263 to further judge whether or not the fuel cut delay control is currently progressing, for example, by checking whether a predetermined time has not elapsed yet after a difference (Ne−Nt) between the engine rotational speed Ne and the input shaft rotational speed Nt becomes equal to or greater than a set value. When the judgment result shows that the fuel cut delay control is currently progressing, the control flow proceeds to step 264 to set the ETC cooperative downshift execution flag xEtc to OFF to prohibit the engine output increasing control (i.e. both of the throttle opening control and the fuel injection restoring control).

When the judgment result in each of the steps 261 to 263 is NO, this routine ends without any processing. In this case, execution of the engine output increasing control (i.e. both the throttle opening control and the fuel injection restoring control) is allowed.

Fuel Injection Restoring Control

Figure 19:
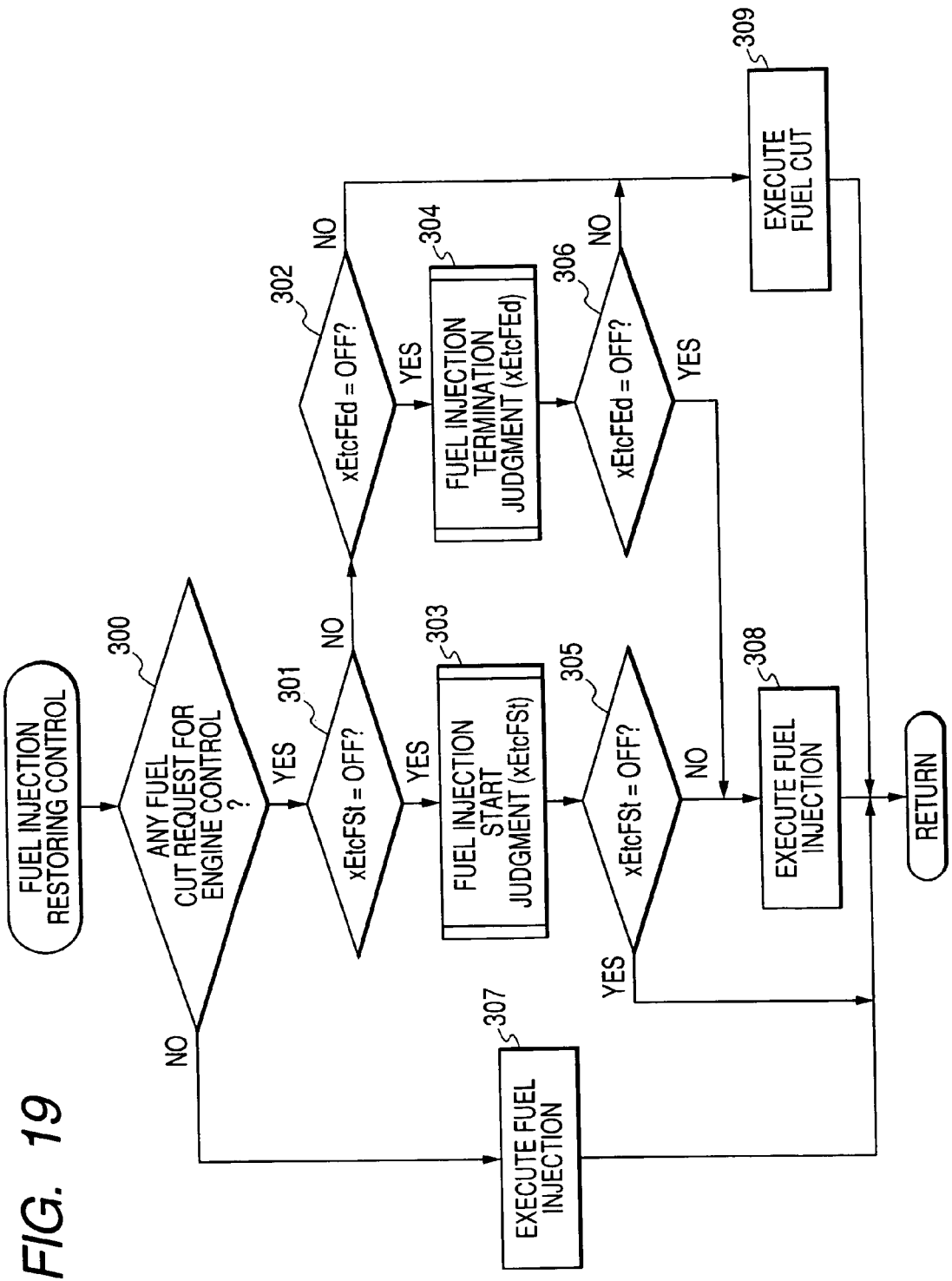
FIG. 19 is a flowchart showing processing flow of a fuel injection restoring control routine in accordance with the first embodiment of the present invention.

FIG. 19 shows the fuel injection restoring control routine that is a sub routine executed in the step 104 of the shift change control routine shown in FIG. 8. The fuel injection restoring control routine shows the function of the claimed engine output increasing means of the present invention. When this routine starts, fuel cut information is transmitted from the engine ECU 25 to the AT-ECU 70 to make a judgment in step 300 as to whether or not any fuel cut request is generated for the engine control. When no fuel cut request is generated, the control flow proceeds to step 307 to continue the fuel injection.

On the other hand, when the judgment result of step 300 shows the presence of a fuel cut request (i.e. the fuel cut operation is currently progressing), the control flow proceeds to step 301 to further judge whether or not a fuel injection restoring control start flag xEtcFSt is OFF. When the flag xEtcFSt is OFF, it means the fuel injection restoring control is not started yet. When the result is OFF, the control flow proceeds to step 303 to execute a fuel injection start judging routine shown in a later-described FIG. 20 to judge the start timing of the fuel injection restoring control. This judgment result is used to determine set/reset of the fuel injection restoring control start flag xEtcFSt.

Then, the control flow proceeds to step 305 to further judge whether or not the fuel injection restoring control start flag xEtcFSt is in OFF condition. When the judgment result is OFF, this routine ends at this moment. When the judgment result is ON, the control flow proceeds to step 308 to execute the fuel injection.

Furthermore, when the judgment result of step 301 shows that the fuel injection restoring control start flag xEtcFSt is ON (i.e. the fuel injection restoring control is currently progressing), the control flow proceeds to step 302 to further judge whether or not a fuel injection restoring control termination flag xEtcFEd is OFF. When the flag xEtcFEd is OFF, it means that the fuel injection restoring control is not terminated yet. When the judgment result is OFF, the control flow proceeds to step 304 to execute a fuel injection termination judging routine shown in a later-described FIG. 21 to judge the termination timing of the fuel injection restoring control. This judgment result is used to determine set/reset of the fuel injection restoring control termination flag xEtcFEd.

Then, the control flow proceeds to step 306 to further judge whether or not the fuel injection restoring control termination flag xEtcFEd is in OFF state. When the judgment result is OFF, the control flow proceeds to step 308 to execute the fuel injection.

Furthermore, when the judgment result of step 306 shows that the fuel injection restoring control termination flag xEtcFEd is ON (i.e. the fuel injection restoring control is terminated), the control flow proceeds to step 309 to restart the fuel cut operation.

Fuel Injection Start Judgment

Figure 20:
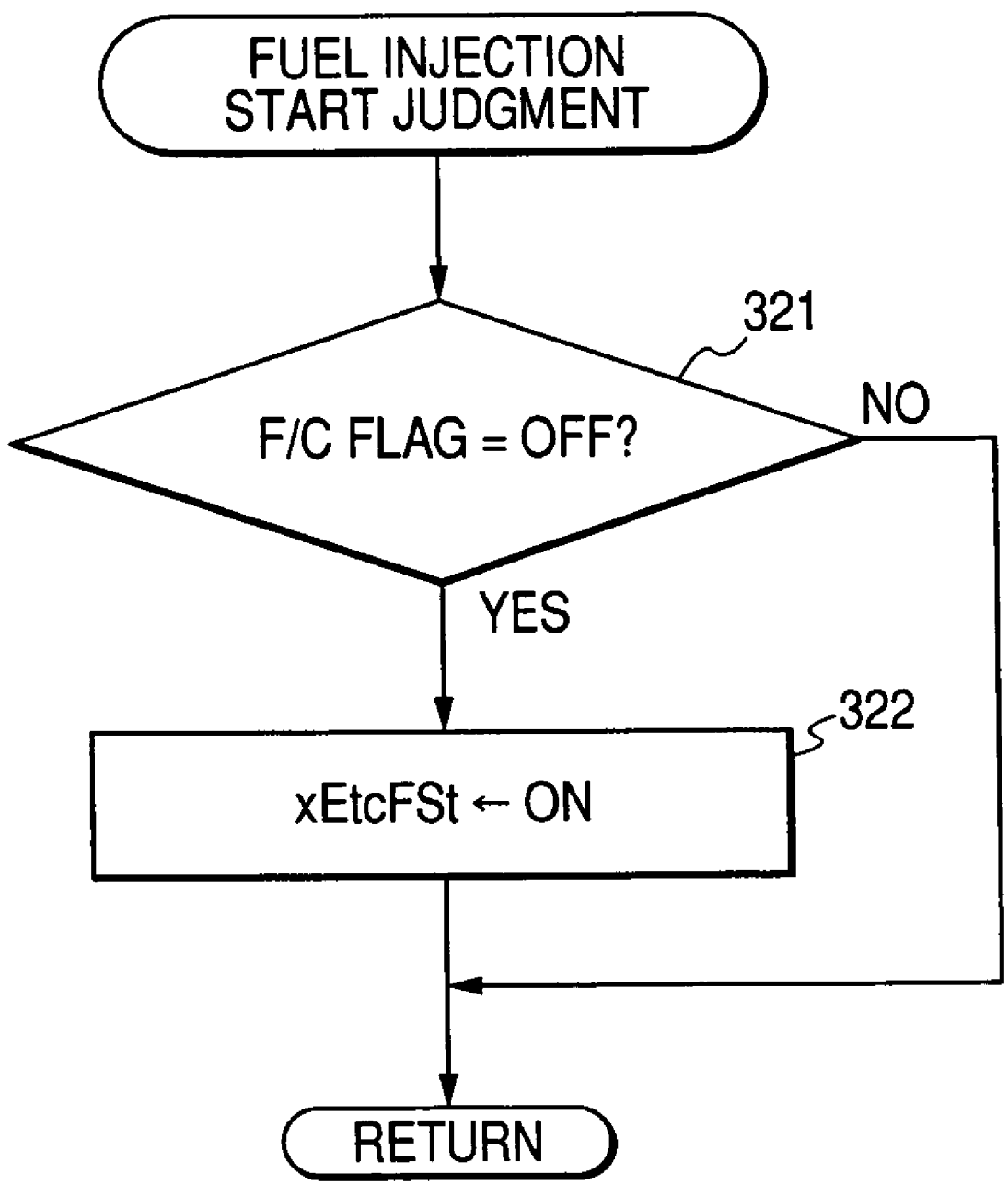
FIG. 20 is a flowchart showing processing flow of a fuel injection start judging routine in accordance with the first embodiment of the present invention.

FIG. 20 shows the fuel injection start judging routine that is a sub routine executed in the step 303 of the fuel injection restoring control routine shown in FIG. 19. When this routine starts, in step 321, fuel cut information is transmitted from the engine ECU 25 to the AT-ECU 70 to judge whether or not the F/C flag (i.e. fuel cut flag) is OFF. When the F/C flag is OFF, the control flow proceeds to step 322 to set the fuel injection restoring control start flag xEtcFSt to ON. Then, this routine ends at this moment. On the other hand, when the judgment result of step 321 shows that the F/C flag is ON, this routine ends at this moment.

Fuel Injection Termination Judgment

Figure 21:
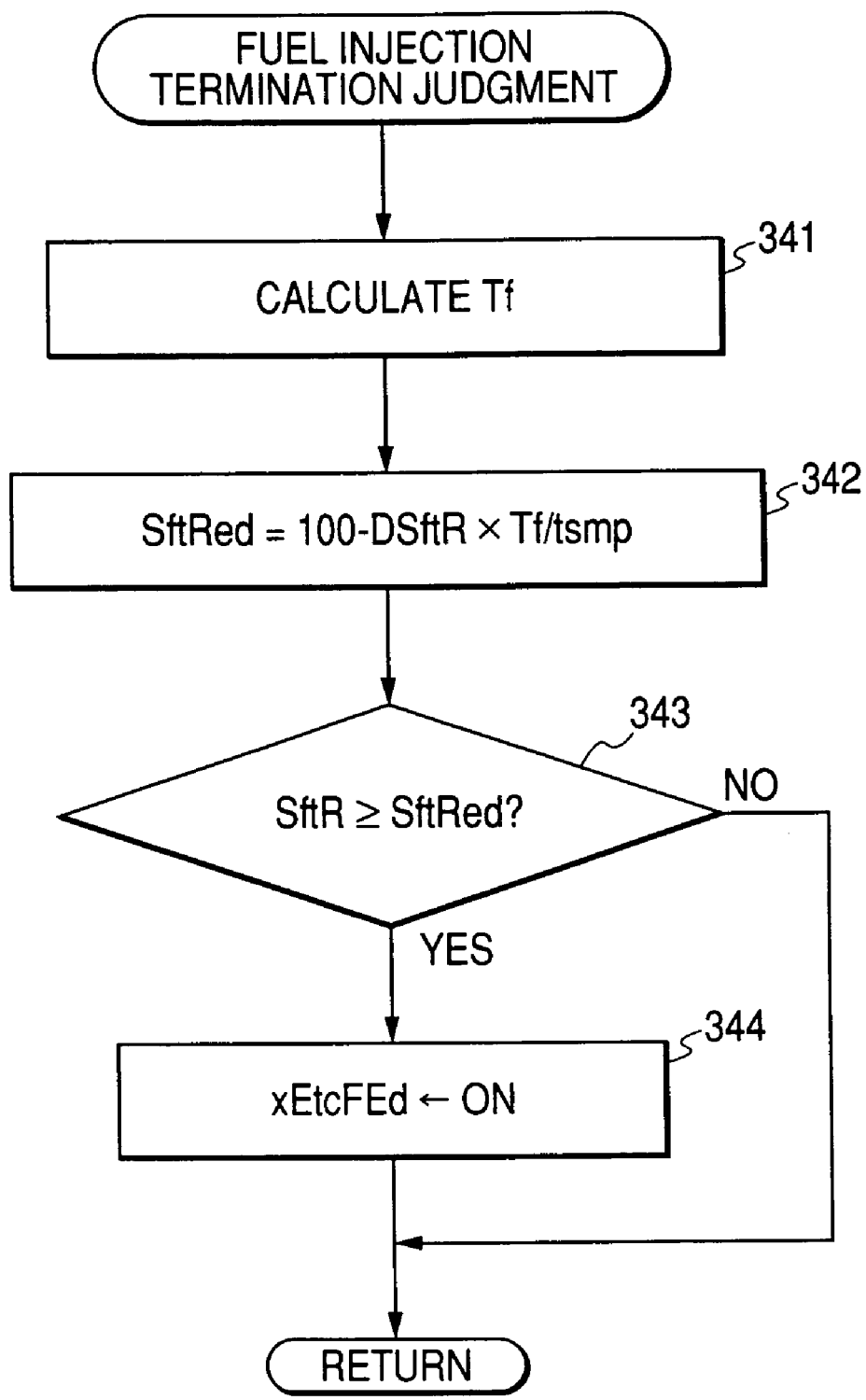
FIG. 21 is a flowchart showing processing flow of a fuel injection termination judging routine in accordance with the first embodiment of the present invention.

FIG. 21 shows the fuel injection termination judging routine that is a sub routine executed in the step 304 of the fuel injection restoring control routine shown in FIG. 19. When this routine starts, in step 341, a response delay (Tf) is calculated. The response delay (Tf) represents a time value required for the engine output reducing to 0 after restarting the fuel cut operation. According to this embodiment, the time T720° CA required for the crank shaft to rotate 720° CA is calculated as the response delay (Tf).

Then, the control flow proceeds to step 342 to calculate a shift change progression rate SftRed at the termination timing of the fuel injection restoring control (i.e. the start timing of the termination control) according to the following equation.

$$SftRed=100-DSftR \times Tf/tsmp$$

where DSftR represents a change amount of shift change progression rate SftR per calculation cycle (i.e. present SftR value−previous SftR value) and tsmp represents the calculation cycle of DSftR.

Then, the control flow proceeds to step 343 to further judge whether or not the present shift change progression rate SftR is equal to or greater than the above-described value SftRed. When the shift change progression rate SftR has not reached the value SftRed yet, this routine ends at this moment. Then, at the timing the shift change progression rate SftR reaches the value SftRed, the control flow proceeds to step 344 to set the fuel injection restoring control termination flag xEtcFEd to ON.

As described above, the first embodiment of the present invention relates to a system that executes an engine output increasing control (i.e. both of the throttle opening control and the fuel injection restoring control) that increases the engine output irrespective of driver's accelerator operation when the ETC cooperative downshift is executed based on a driver's intent to decelerate. In this system, the engine output increasing control starts at the timing the reduction amount ΔNt in the input shaft rotational speed Nt exceeds the set value K after the ETC cooperative downshift control is started. In short, the first embodiment is made based on the fact that, when the hydraulic pressure decreases in a to-be-disengaged clutch after the ETC cooperative downshift control is started, the input shaft rotational speed Nt decreases. At the timing a reduction in the input shaft rotational speed Nt exceeds a predetermined value K after the ETC cooperative downshift control is started, it is presumed that the hydraulic pressure of the to-be-disengaged clutch is already reduced to a hydraulic pressure level equivalent to a predetermined transmission torque capacity that causes no undesirable acceleration or shock even if the engine output increasing control is started. And, under such assumption, the engine output increasing control is started at this timing. Accordingly, this embodiment can accurately set the start timing of the engine output increasing control so as to suppress any undesirable acceleration or shock caused by the engine output increasing control. Furthermore, this embodiment does not rely on a timer in setting the start timing of the engine output increasing control. Thus, the engine output increasing control can be executed with a simple logical arrangement and relatively small parameter settings. This brings the merit of easiness in practical use of this invention.

The fuel cut operation is executed when predetermined fuel cut execution conditions, including accelerator fully closed condition, are established. However, immediately starting the fuel cut operation may generate a torque shock. To solve this problem, the engine control ECU 25 executes a fuel cut delay control that delays the start timing of the fuel cut operation to eliminate undesirable torque shock. The fuel injection during the fuel cut delay control generates a significant amount of engine torque. If the engine output increasing control is started during this fuel cut delay control, an overall engine torque will become excessively large and the vehicle will be accelerated undesirably.

Figure 22:
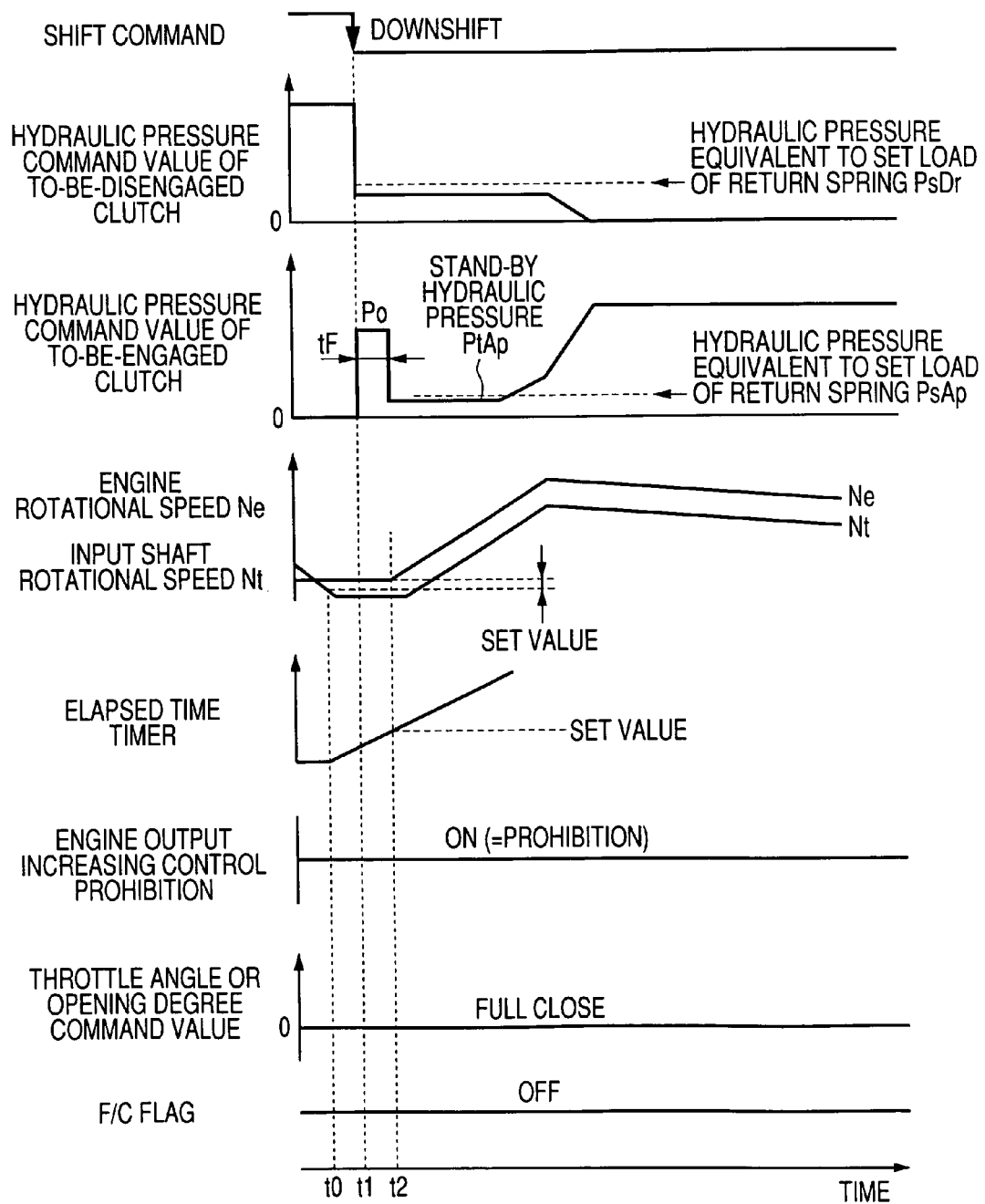
FIG. 22 is a time diagram showing a second example of the ETC cooperative downshift control in accordance with the first embodiment of the present invention.

To solve this problem, as shown in FIG. 22, the first embodiment causes the timer to measure elapsed time at the timing t0 where the difference (Ne−Nt) between the engine rotational speed Ne and the input shaft rotational speed Nt exceeds a set value. When a downshift request is generated at timing t1 before the timer value reaches a set value (i.e. a predetermined time) at timing t2, it is concluded that this is a downshift request during the fuel cut delay control and accordingly the engine output increasing control is prohibited at this timing t1. In short, it is presumed that the fuel cut delay control continues within a predetermined time after the timing t0 where the difference (Ne−Nt) between the engine rotational speed Ne and the input shaft rotational speed Nt exceeds a set value. Thus, the engine output increasing control is prohibited during this period. Accordingly, the engine output increasing control is prohibited when the fuel cut delay control is progressing, so as to eliminate adverse effects caused by executing the engine output increasing control during the fuel cut delay control.

Second Embodiment

Figure 23:
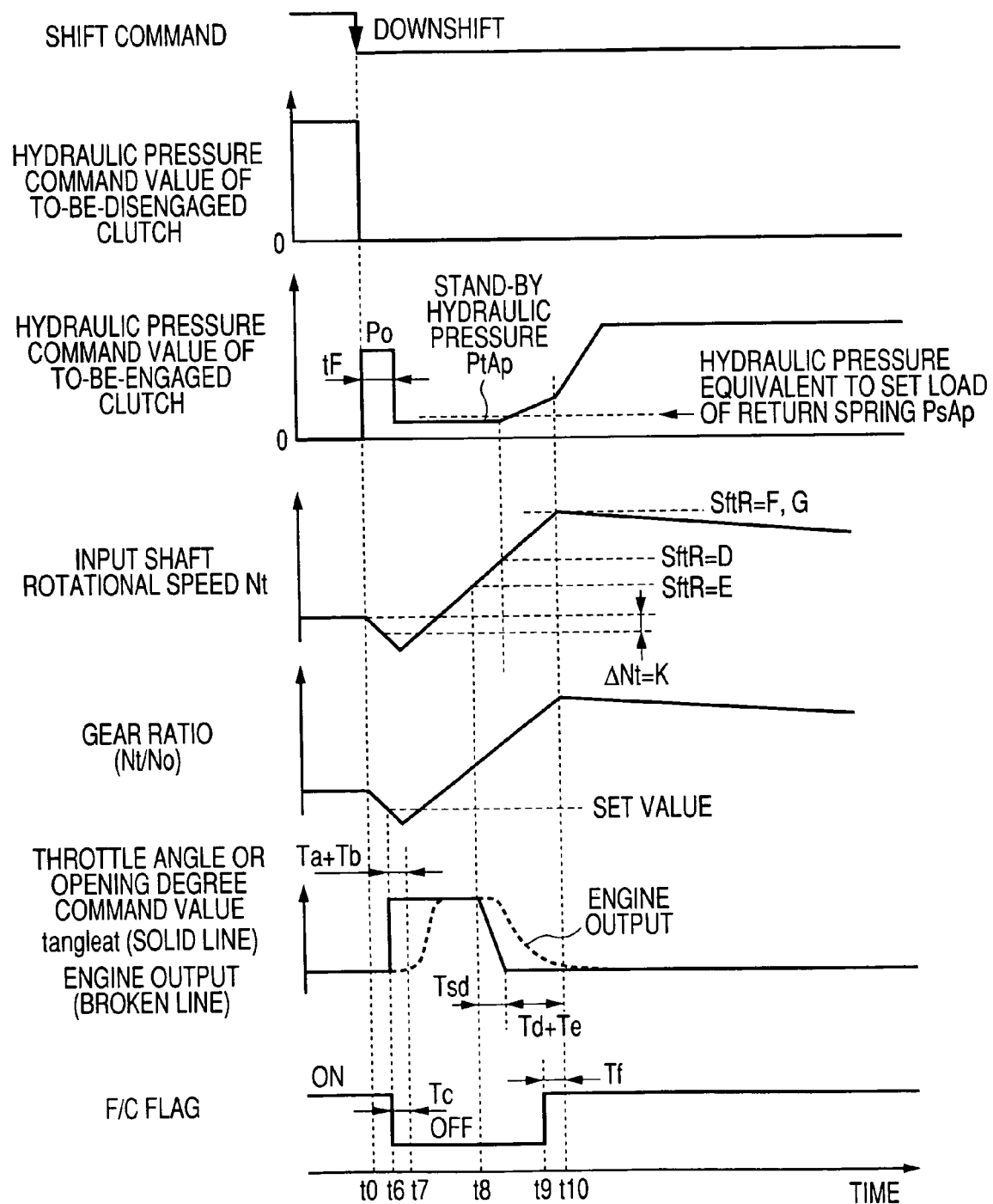
FIG. 23 is a time diagram showing one example of the ETC cooperative downshift control in accordance with a second embodiment of the present invention.
Figure 24:
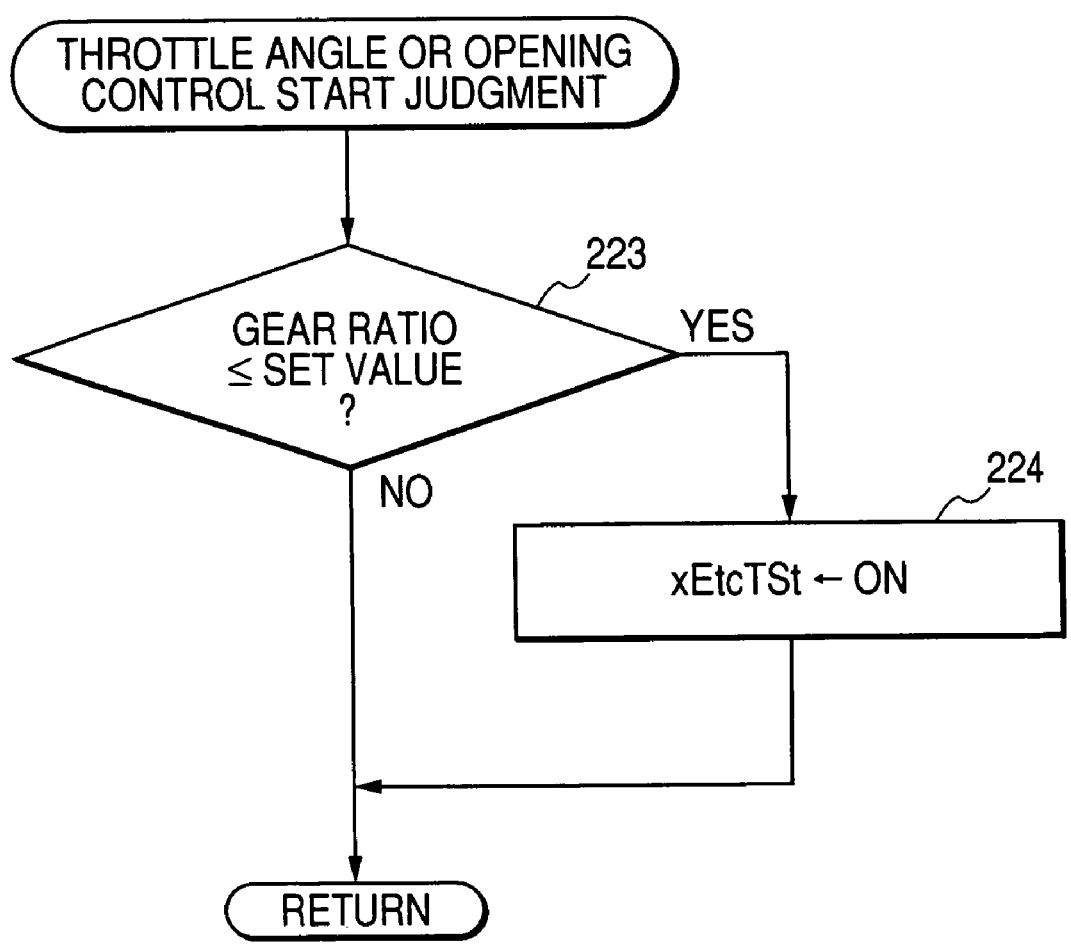
FIG. 24 is a flowchart showing processing flow of the throttle opening control start judging routine in accordance with the second embodiment of the present invention.

FIGS. 23 and 24 show a second embodiment of the present invention that is made based on the fact a gear ratio (=input shaft rotational speed Nt/output shaft rotational speed No) decreases when the input shaft rotational speed Nt decreases after the ETC cooperative downshift control starts. At the timing the gear ratio falls below a set value after the ETC cooperative downshift control is started, it is presumed that the hydraulic pressure of the to-be-disengaged clutch is already reduced to a hydraulic pressure level equivalent to a predetermined transmission torque capacity that causes no undesirable acceleration or shock even if the engine output increasing control is started. And, under such assumption, the engine output increasing control is started at this timing.

FIG. 24 shows a throttle opening control start judging routine according to the second embodiment of the present invention. When this routine starts, a judgment is made in step 223 as to judge whether or not the gear ratio is equal to or less than a set value. When the gear ratio is greater than the set value, it is concluded that the engine output increasing control should not start at this moment. Thus, this routine ends at this moment.

Subsequently, at the timing the gear ratio becomes equal to or less than the set value, it is concluded that the engine output increasing control should start at this moment. Thus, the control flow proceeds to from step 223 to step 224 to set the throttle opening control start flag xEtcTSt to ON. The remaining routines are processed in the same manner as those disclosed in the first embodiment. Accordingly, the second embodiment can bring the effect similar to those of the first embodiment.

Third Embodiment

Figure 25:
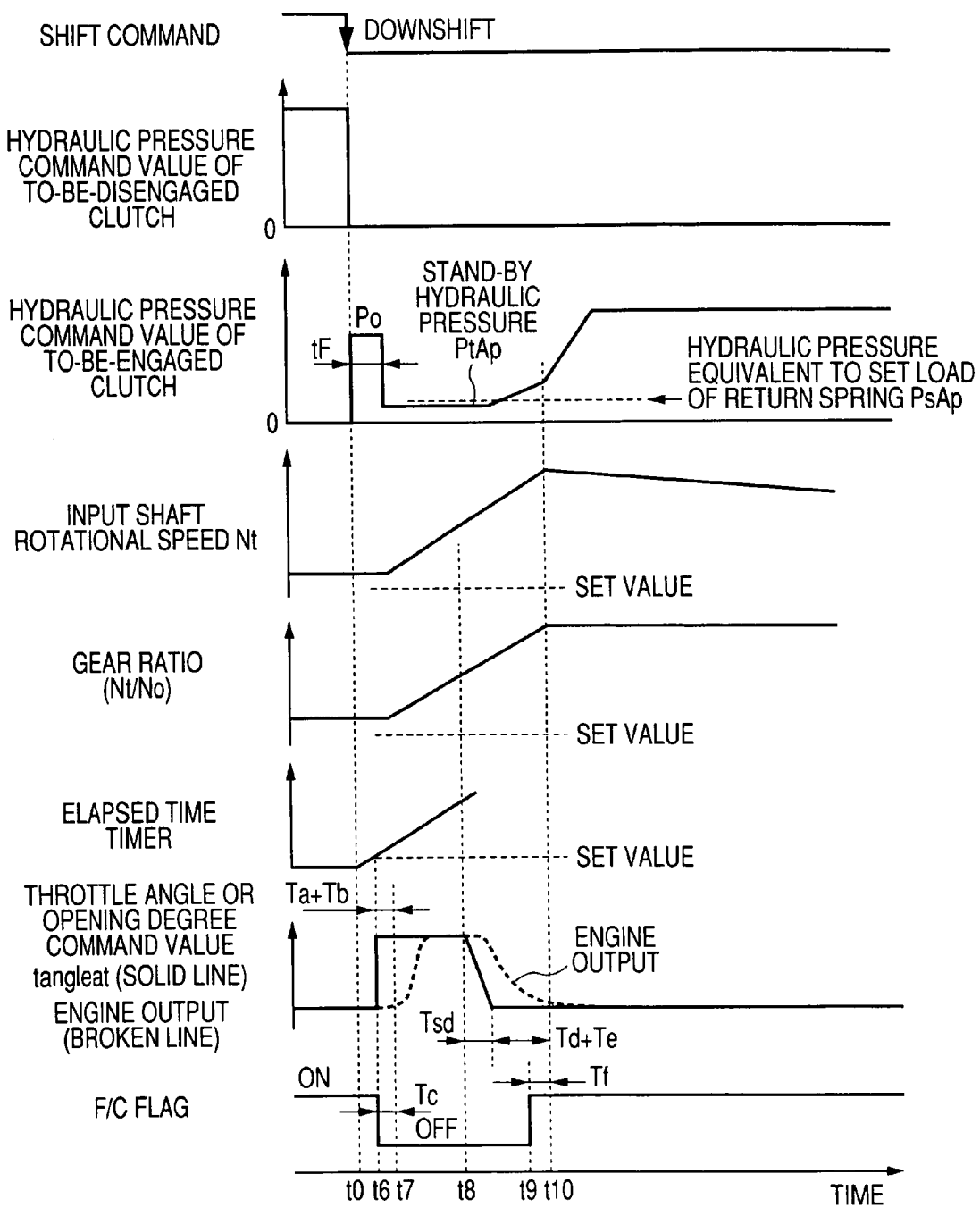
FIG. 25 is a time diagram showing one example of the ETC cooperative downshift control in accordance with a third embodiment of the present invention.

In some cases, as shown in FIG. 25, the input shaft rotational speed Nt or the gear ratio may not decrease sufficiently depending on engine control conditions even after the ETC cooperative downshift control is started. In such a case, according to the above-described first and second embodiments, the engine output increasing control will not start for a relatively long time.

Figure 26:
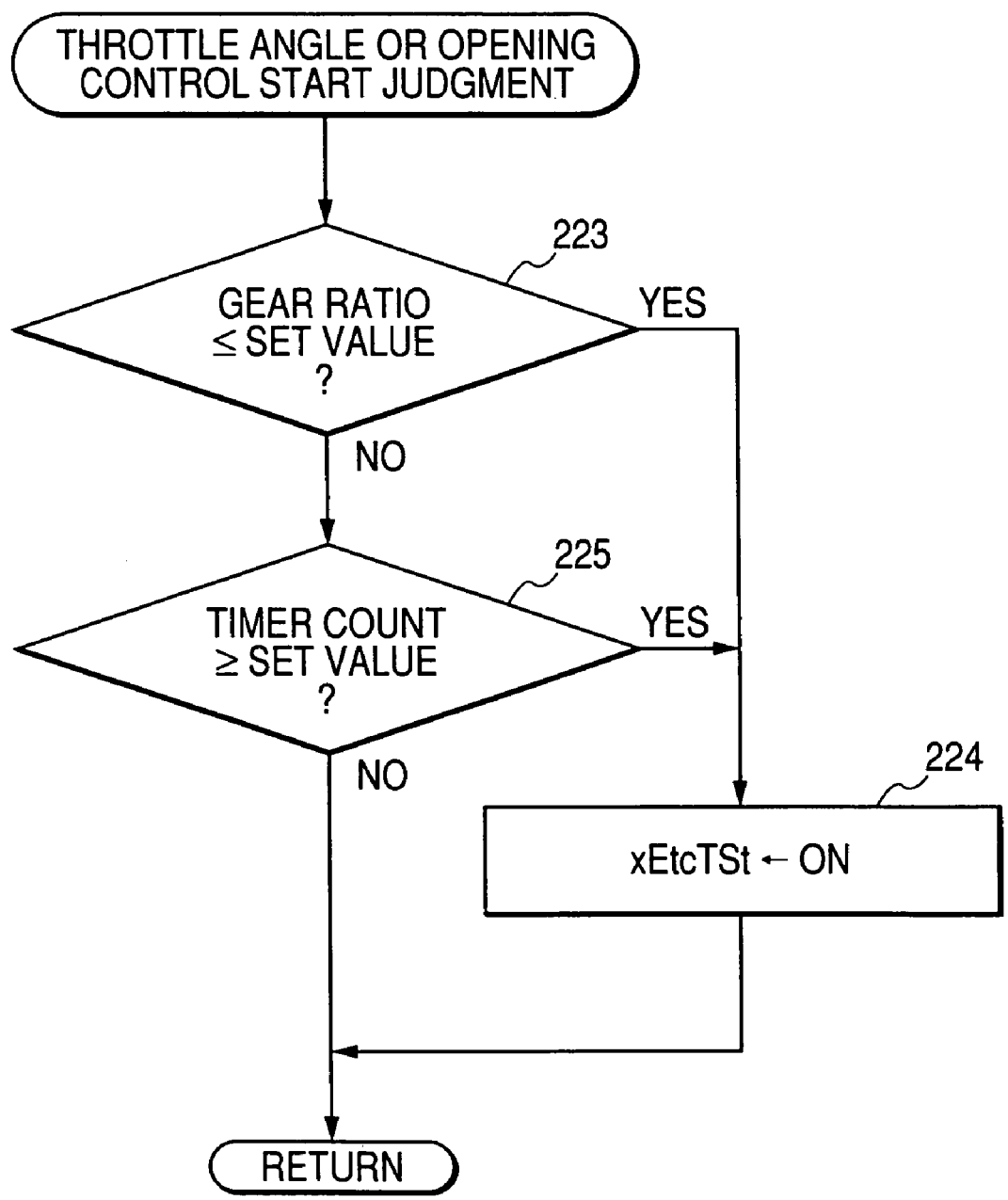
FIG. 26 is a flowchart showing processing flow of the throttle opening control start judging routine in accordance with the third embodiment of the present invention.

Hence, according to a third embodiment of the present invention shown in FIGS. 25 and 26, an elapsed time timer (i.e. timer means) is provided to measure the time having elapsed after the ETC cooperative downshift control is started. When the engine output increasing control does not start even after the elapsed time exceeds the set value, the engine output increasing control is forcibly started.

FIG. 26 shows a throttle opening control start judging routine according to the third embodiment of the present invention. When this routine starts, a judgment is made in step 223 as to whether or not the gear ratio is equal to or less than a set value. When the gear ratio is greater than the set value, the control flow proceeds to step 225 to further judge whether or not the elapsed time timer count is equal to or greater than a set value. When the elapsed time timer count is less than the set value, this routine ends at this moment.

Subsequently, when gear ratio falls below the set value before the elapsed time timer count reaches the set value, the control flow proceeds from step 223 to step 224 to set the throttle opening control start flag xEtcTSt to ON.

On the other hand, when the elapsed time timer count reaches the set value before the gear ratio falls below the set value, the control flow proceeds from step 225 to step 224 to set the throttle opening control start flag xEtcTSt to ON. The remaining routines are processed in the same manner as those disclosed in the first embodiment.

As described above, the third embodiment forcibly starts the engine output increasing control when the time elapsed after starting the ETC cooperative downshift control start exceeds a set value. Thus, the third embodiment can start the engine output increasing control at appropriate timing being set beforehand, even when the gear ratio does not fall sufficiently after starting the ETC cooperative downshift control.

The above judgment "gear ratio≦set value?" in the step 223 can be replaced with the judgment "ΔNt≧set value?" used in the first embodiment. The similar effect will be obtained in judging the start timing of the engine output increasing control (i.e. throttle opening control).

Fourth Embodiment

Figure 27:
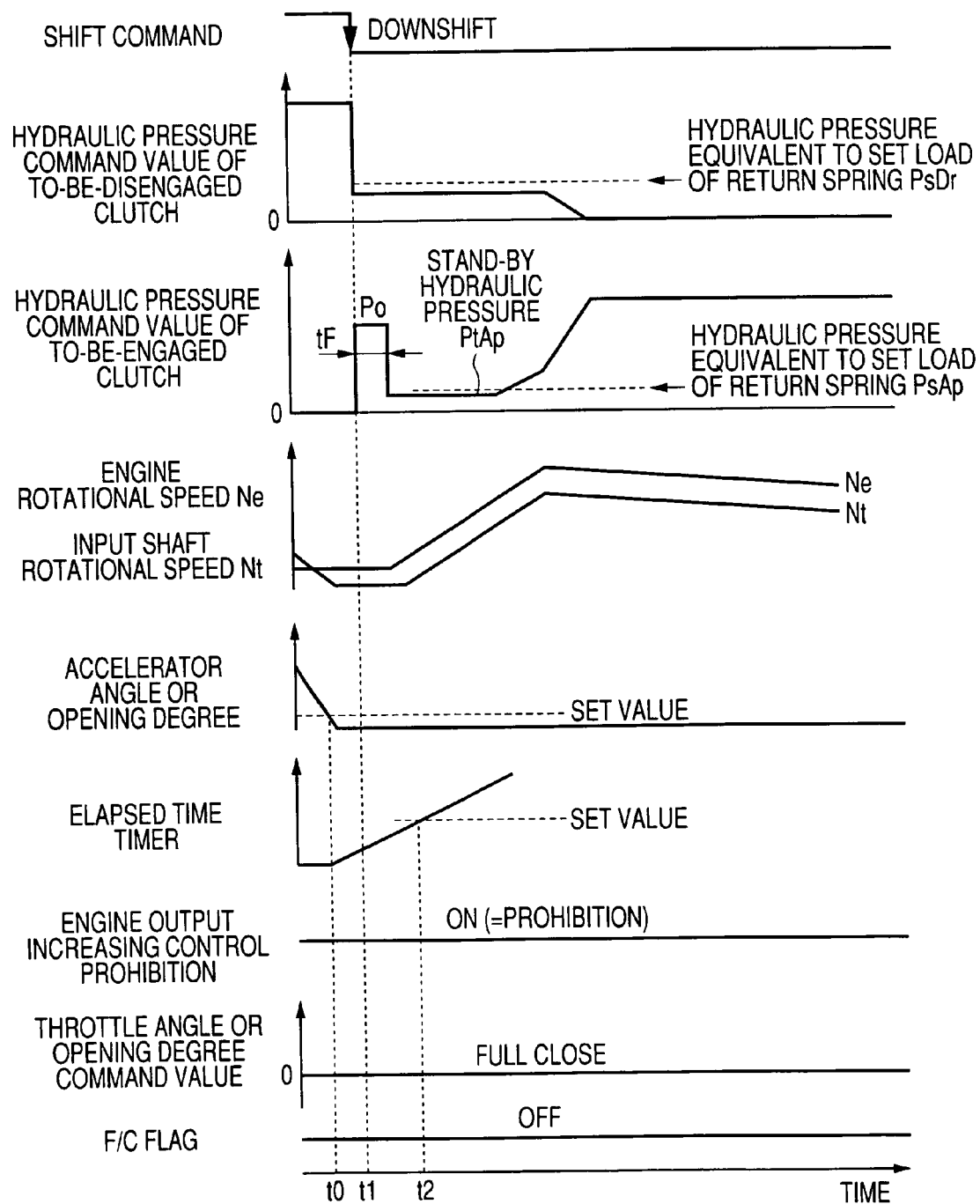
FIG. 27 is a time diagram showing one example of the ETC cooperative downshift control in accordance with a fourth embodiment of the present invention.
Figure 28:
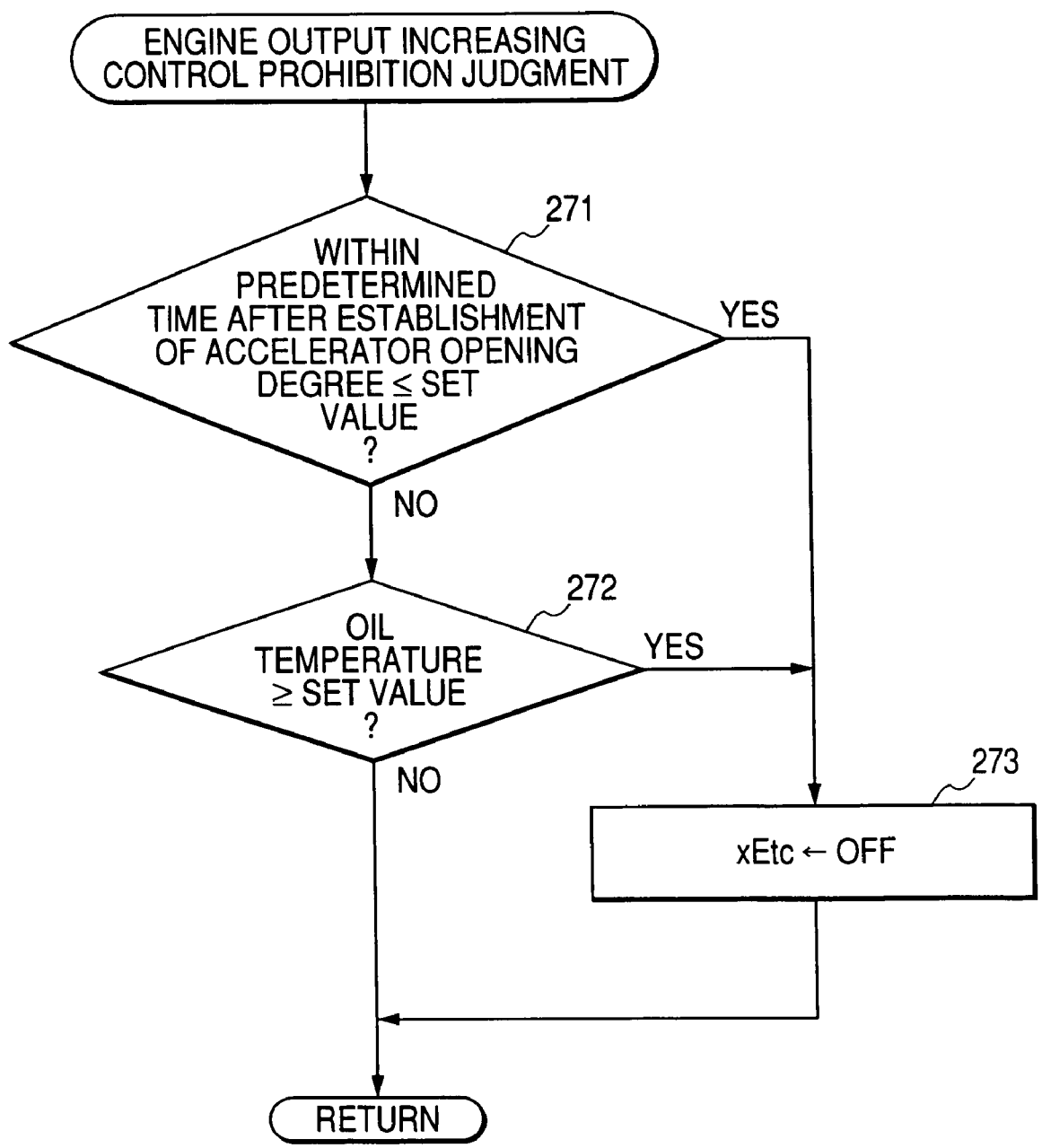
FIG. 28 is a flowchart showing processing flow of the engine output increasing control prohibition judging routine in accordance with the fourth embodiment of the present invention.

FIGS. 27 and 28 shows a fourth embodiment of the present invention that is characterized in that the elapsed time timer starts at timing t0 the accelerator opening degree detected by the accelerator sensor 27 falls below a set value. When a downshift request is generated at timing t1 before the elapsed time timer count reaches a set value (i.e. predetermined time) at timing t2, it is concluded that this is a downshift request during the fuel cut delay control. Accordingly, the engine output increasing control is prohibited.

FIG. 28 shows an engine output increasing control prohibition judging routine according to this embodiment. When this routine starts, a judgment is made in step 271 as to whether a predetermined time has not elapsed yet after the accelerator opening degree detected by the accelerator sensor 27 became equal to or less than a set value. When the predetermined time has not elapsed yet, the control flow proceeds to step 273 to set the ETC cooperative downshift execution flag xEtc to OFF. Thus, the engine output increasing control (i.e. both of the throttle opening control and the fuel injection restoring control) is prohibited.

On the other hand, when the above predetermined time has already elapsed after the accelerator opening degree became equal to or less than the set value, the control flow proceeds from step 271 to step 272 to further judge whether or not the oil temperature is equal to or greater than a set value. When the oil temperature is equal to or greater than the set value, the control flow proceeds to step 273 to set the ETC cooperative downshift execution flag xEtc to OFF. Thus, the engine output increasing control (i.e. both of the throttle opening control and the fuel injection restoring control) is prohibited. On the other hand, when the oil temperature is less than the set value, this routine ends at this moment. In this case, execution of the engine output increasing control (i.e. both of the throttle opening control and the fuel injection restoring control) is allowed.

As described above, the fourth embodiment presumes that the fuel cut delay control continues until a predetermined time elapses after the accelerator opening degree is equal to or less than a set value and accordingly prohibits the engine output increasing control. Thus, no engine output increasing control is allowed during the fuel cut delay control. It becomes possible to eliminate adverse effects caused by executing engine output increasing control during the fuel cut delay control.

Fifth Embodiment

Figure 29:
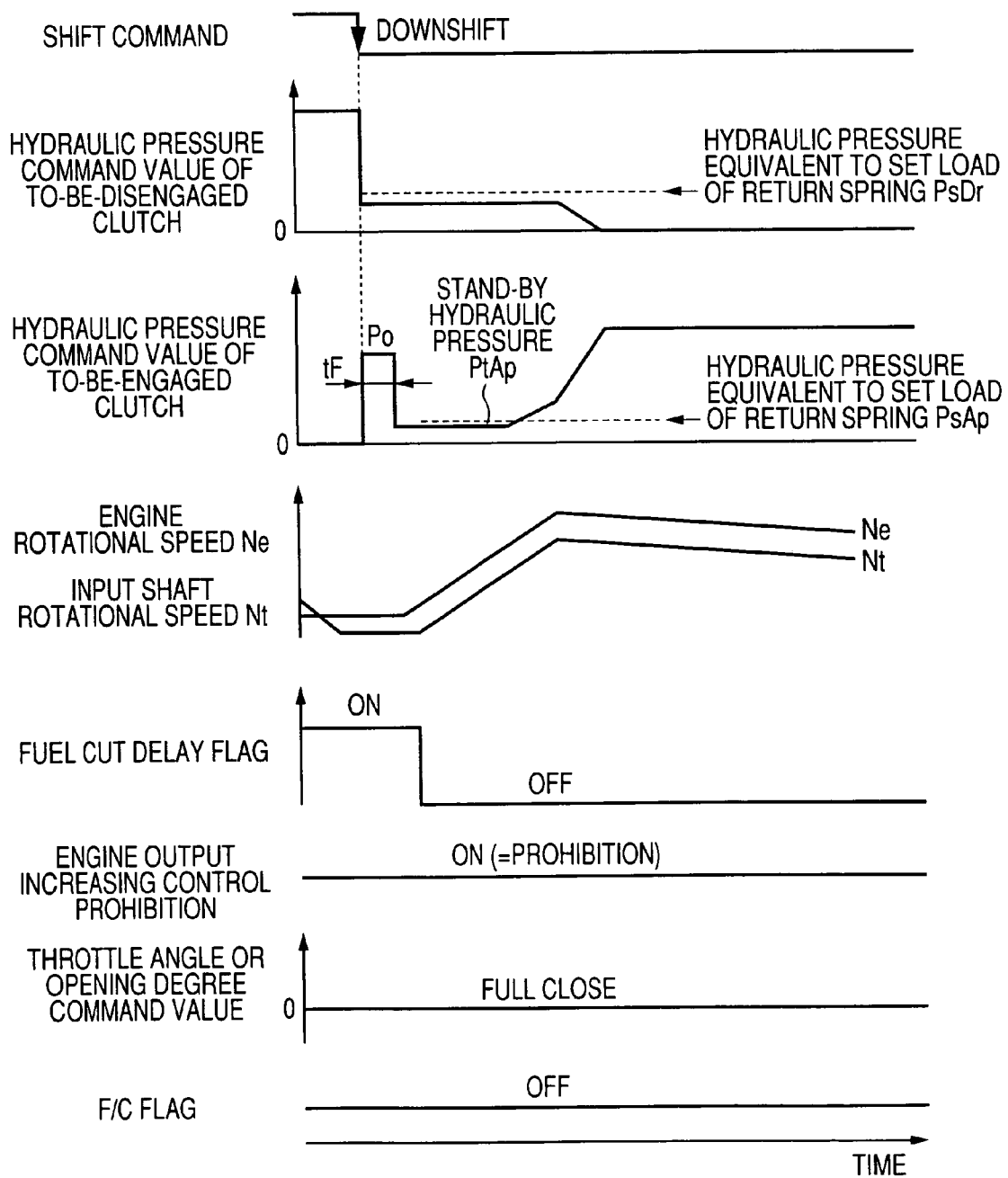
FIG. 29 is a time diagram showing one example of the ETC cooperative downshift control in accordance with a fifth embodiment of the present invention.
Figure 30:
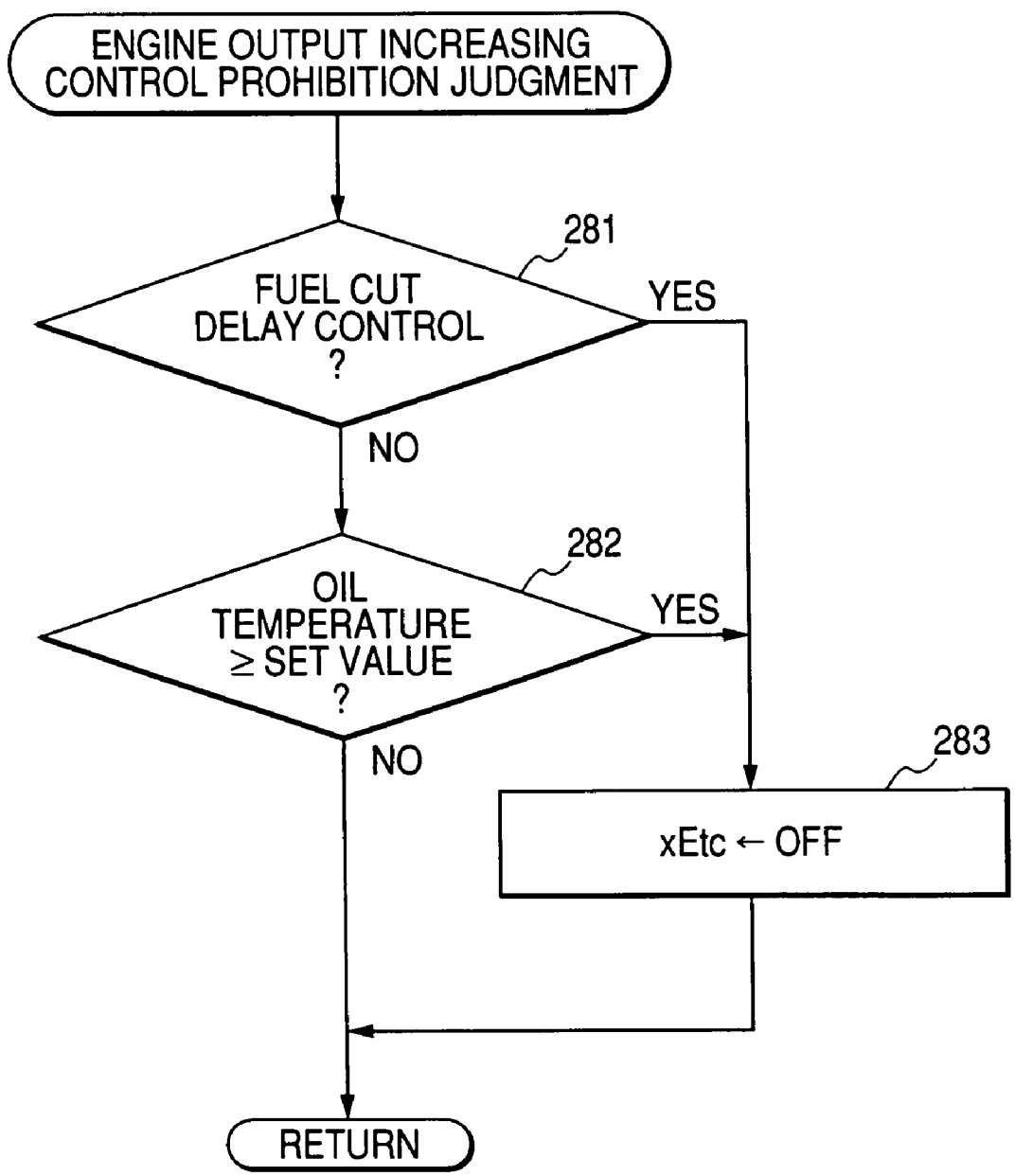
FIG. 30 is a flowchart showing processing flow of the engine output increasing control prohibition judging routine in accordance with the fifth embodiment of the present invention.

FIGS. 29 and 30 show a fifth embodiment of the present invention that is characterized in that the engine ECU 25, when executing the fuel cut delay control, transmits fuel cut delay information (i.e. a fuel cut delay flag) to the AT-ECU 70 so that the engine output increasing control can be prohibited when a downshift request is generated during the fuel cut delay control.

FIG. 30 shows an engine output increasing control prohibition judging routine according to this embodiment. When this routine starts, in step 281, a judgment whether or not the fuel cut delay control is currently progressing is made based on fuel cut delay information transmitted from the engine ECU 25 to the AT-ECU 70. When the fuel cut delay control is currently progressing, the control flow proceeds to step 283 to set the ETC cooperative downshift execution flag xEtc to OFF. Thus, the engine output increasing control (i.e. both of the throttle opening control and the fuel injection restoring control) is prohibited.

On the other hand, when the judgment result of step 281 shows that the fuel cut delay control is not currently progressing, the control flow proceeds to step 282 to further judge whether or not the oil temperature is equal to or greater than a set value. When the oil temperature is equal to or greater than the set value, the control flow proceeds to step 283 to set the ETC cooperative downshift execution flag xEtc to OFF. Thus, the engine output increasing control (i.e. both of the throttle opening control and the fuel injection restoring control) is prohibited. On the other hand, when the oil temperature is less than the set value, this routine ends at this moment. In this case, execution of the engine output increasing control (i.e. both of the throttle opening control and the fuel injection restoring control) is allowed.

As described above, the fifth embodiment directly obtains fuel cut delay information from the engine ECU 25 and surely prohibits the engine output increasing control (i.e. both of the throttle opening control and the fuel injection restoring control) during the fuel cut delay control.

Sixth Embodiment

Figure 31:
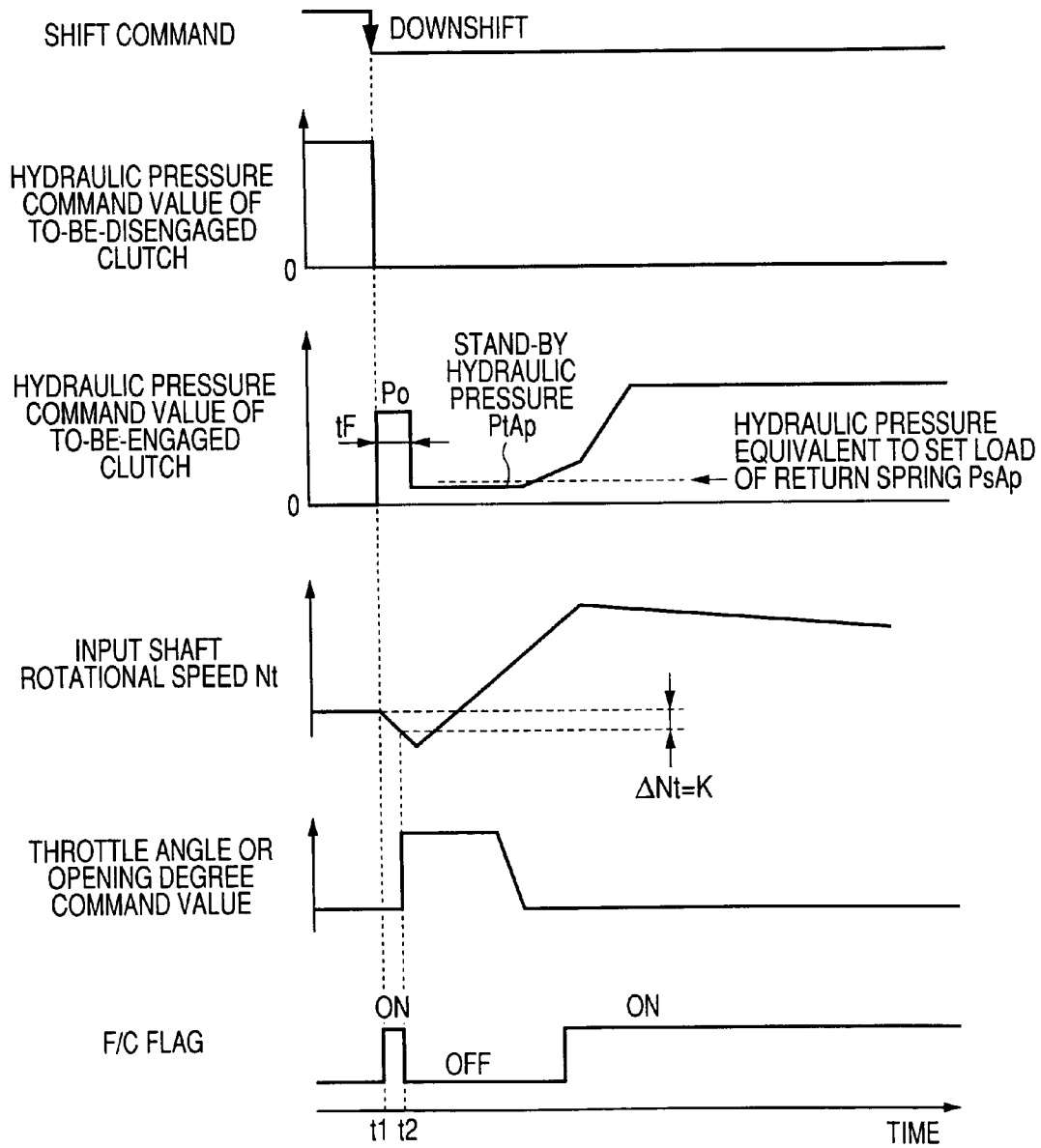
FIG. 31 is a time diagram showing one example of the ETC cooperative downshift control in accordance with a sixth embodiment of the present invention.

FIG. 31 shows a sixth embodiment of the present invention that is characterized by executing the fuel cut operation during a period from start timing t1 of the ETC cooperative downshift control to start timing t2 of the engine output increasing control. When the ETC cooperative downshift control is started, the hydraulic pressure command value of the to-be-disengaged clutch is promptly reduced to a minimum hydraulic pressure (0 kPa) or its vicinity so that the transmission torque capacity of the to-be-disengaged clutch is quickly reduced to 0. Hence, no torque shock will be generated even of the fuel cut operation is immediately started. The input shaft rotational speed Nt and the gear ratio are not reduced undesirably. The engine output increasing control can be started at earlier timing and accordingly the downshift operation can be quickly accomplished.

Seventh Embodiment

Figure 32:
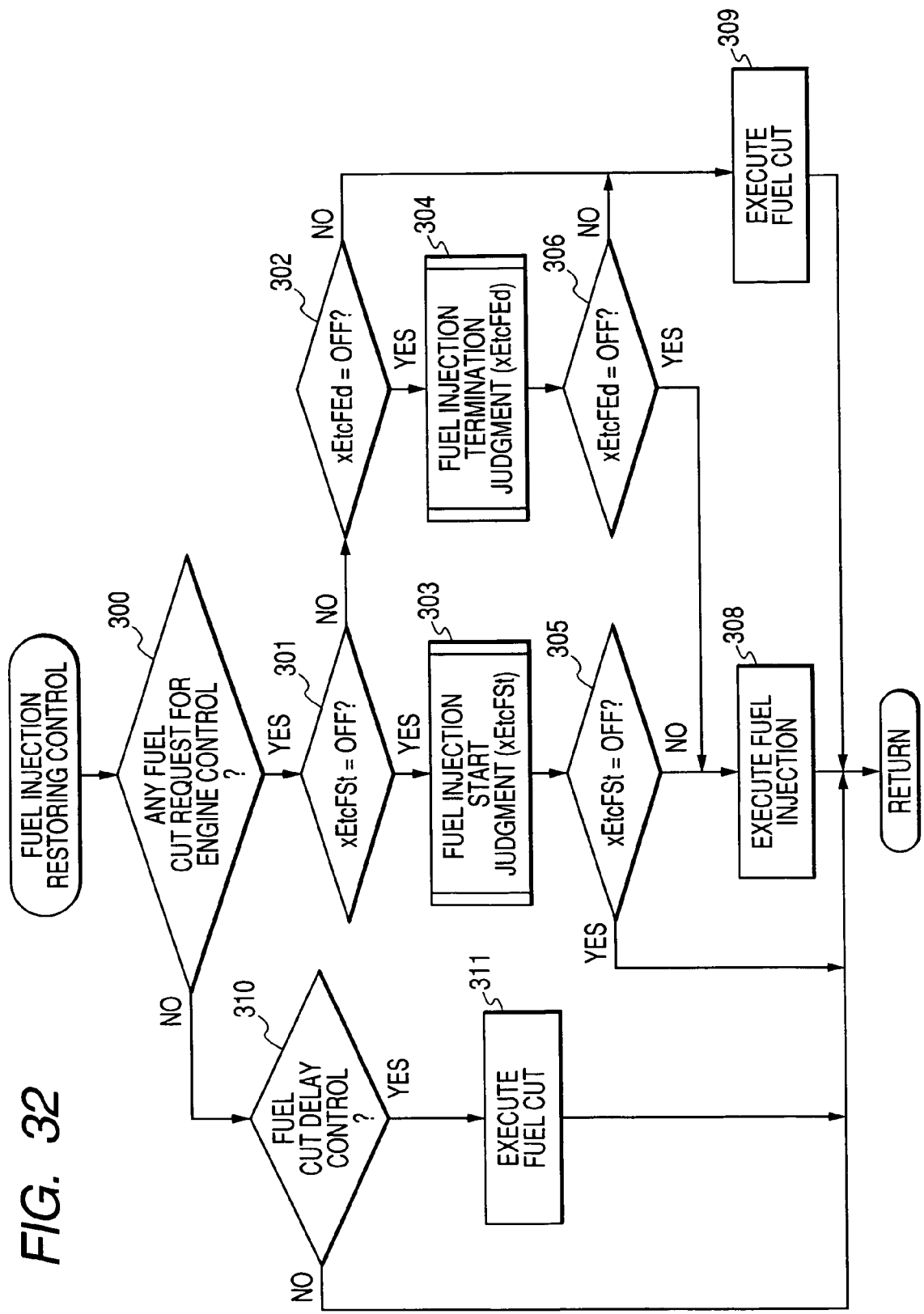
FIG. 32 is a flowchart showing processing flow of a fuel injection restoring control routine in accordance with a seventh embodiment of the present invention.
Figure 33:
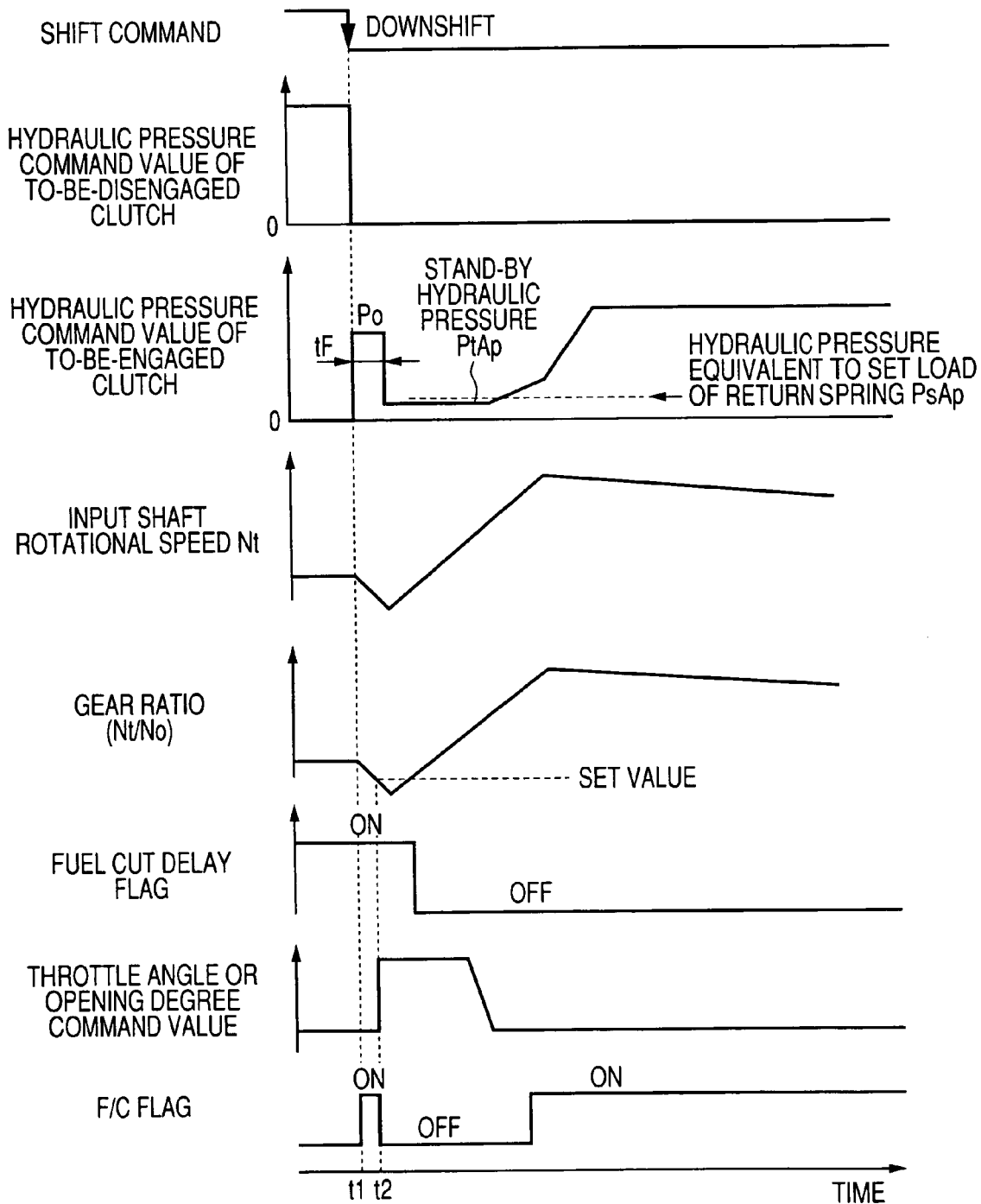
FIG. 33 is a time diagram showing one example of the ETC cooperative downshift control in accordance with the seventh embodiment of the present invention.

FIGS. 32 and 33 show a seventh embodiment of the present invention that is characterized by executing the fuel cut operation during a period from start timing t1 of the ETC cooperative downshift control to start timing t2 of the engine output increasing control only when the fuel cut delay control is progressing. Namely, this embodiment does not execute the fuel cut operation in an event that no fuel cut delay control is executed, even if its timing is in the period from the start timing t1 of the ETC cooperative downshift control to the start timing t2 of the engine output increasing control. According to this embodiment, it becomes possible to prevent the engine from stalling due to execution of the fuel cut operation in a case the fuel injection is carried out in response to a request other than the fuel cut delay, for example, when a small amount of fuel is injected to maintain engine rotations in a low-speed region.

FIG. 32 shows a fuel injection restoring control routine according to this embodiment. When this routine starts, a judgment whether or not any fuel cut request is generated for the engine control is made in step 300 based on fuel cut information transmitted from the engine ECU 25 to the AT-ECU 70. When no fuel cut request is generated, the control flow proceeds to step 310 to judge whether or not the fuel cut delay control is currently progressing. When the judgment result shows that no fuel cut delay control is currently executed, this routine ends at this moment. On the other hand, when the judgment result shows that the fuel cut delay control is currently executed, the control flow proceeds to step 311 to execute the fuel cut operation.

Furthermore, when the judgment result of step 300 shows the presence of any fuel cut request generated for the engine control, either the fuel injection or the fuel cut operation is carried out in the same manner as the fuel injection restoring control routine of the first embodiment of FIG. 19.

As described above, the seventh embodiment does not execute the fuel cut operation in an event that no fuel cut delay control is executed, even if its timing is in the period from the start timing t1 of the ETC cooperative downshift control to the start timing t2 of the engine output increasing control. According to this embodiment, it becomes possible to prevent the engine from stalling due to execution of the fuel cut operation in a case the fuel injection is carried out in response to a request other than the fuel cut delay, for example, when a small amount of fuel is injected to maintain engine rotations in a low-speed region.

Eighth Embodiment

If the accelerator pedal is slightly depressed after the ETC cooperative downshift control is started, the input shaft rotational speed will not decrease so smoothly and accordingly the engine output increasing control will not start for a relatively long time.

FIG. 34 shows an eighth embodiment of the present invention that is characterized by executing the fuel cut during a period from the start timing t1 of the ETC cooperative downshift control to the start timing t2 of the engine output increasing control not only when the fuel cut delay control is currently progressing but also when the accelerator opening degree is equal to or smaller than a predetermined value (step 312). According to this arrangement, even if the accelerator pedal is slightly depressed after the ETC cooperative downshift control is started, executing the fuel cut operation makes it possible to smoothly reduce the input shaft rotational speed Nt. The engine output increasing control starts at earlier timing.

Although the above-described embodiments realize the engine output increasing control based on a combination of the throttle opening control and the fuel injection restoring control, it is possible to use a fuel increasing control or an ignition retard control as one of the engine output increasing control. It is also possible to replace the combination of the throttle opening control and the fuel injection restoring control with a combination of the fuel increasing control or the ignition retard control. The engine output increasing control will be realized in the same manner. Furthermore, although the above-described embodiments are based on a gasoline engine, the present invention will bring similar effects on a diesel engine if the engine output increasing control is executed by increasing the fuel injection amount.

What is claimed is:

1. A control apparatus for an automatic transmission provided with a speed change mechanism, wherein the control apparatus includes a hydraulic pressure control means for individually controlling hydraulic pressure acting to a plurality of frictional engaging elements to selectively switch engagement and disengagement of respective frictional engaging elements, thereby switching a gear stage of the speed change mechanism, said control apparatus comprising:
    downshift control means for controlling the hydraulic pressure, in response to a driver's command to decelerate, in such a manner that said speed change mechanism causes a downshift to a gear stage capable of producing an engine brake;
    engine output increasing means for executing an engine output increasing control that increases an engine output during said downshift control irrespective of a driver's accelerator operation; and
    input shaft speed detecting means for detecting an input shaft rotational speed of said speed change mechanism,
    wherein said engine output increasing means starts said engine output increasing control when a reduction in the input shaft rotational speed of said speed change mechanism exceeds a predetermined value.

2. The control apparatus for an automatic transmission in accordance with claim 1, further comprising:
    timer means for measuring an elapsed time from start timing of said downshift control,
    wherein said engine output increasing means forcibly starts said engine output increasing control when the elapsed time from the start timing of said downshift control exceeds a predetermined time, if said engine output increasing control is not started yet.

3. The control apparatus for an automatic transmission in accordance with claim 1, further comprising:
    means for calculating a difference between an engine rotational speed and said input shaft rotational speed,
    wherein said engine output increasing means includes means for prohibiting said engine output increasing control in response to a downshift request generated within a predetermined time after the difference between the engine rotational speed and the input shaft rotational speed exceeds a predetermined value.

4. The control apparatus for an automatic transmission in accordance with claim 1, further comprising:
    accelerator opening degree detecting means for detecting an accelerator opening degree, wherein said engine output increasing means includes means for prohibiting said engine output increasing control in response to a downshift request generated within a predetermined time after the accelerator opening degree becomes smaller than a predetermined value.

5. The control apparatus for an automatic transmission in accordance with claim 1, wherein said engine output increasing means includes:
   means for receiving fuel cut delay information from an engine control computer when said engine control computer is executing a fuel cut delay control that delays start timing of a fuel cut operation, and
   means for prohibiting said engine output increasing control when a downshift request is generated during said fuel cut delay control.

6. The control apparatus for an automatic transmission in accordance with claim 1, wherein:
   said downshift control means immediately decreases a hydraulic pressure command value to a minimum hydraulic pressure or its vicinity for a frictional engaging element to be disengaged when said downshift control is started.

7. The control apparatus for an automatic transmission in accordance with claim 1, further comprising:
   fuel cut executing means for executing a fuel cut operation in response to execution of said downshift control until said engine output increasing control is started.

8. The control apparatus for an automatic transmission in accordance with claim 7, wherein:
   said fuel cut executing means executes the fuel cut operation only when an engine control computer is executing a fuel cut delay control that delays start timing of the fuel cut operation.

9. The control apparatus for an automatic transmission in accordance with claim 7, wherein:
   said fuel cut executing means executes the fuel cut operation when an accelerator opening degree is less than a predetermined value.

10. A method for controlling an automatic transmission provided with a speed change mechanism, wherein the control apparatus controls hydraulic pressure acting to a plurality of frictional engaging elements to selectively switch engagement and disengagement of respective frictional engaging elements, thereby switching a gear stage of the speed change mechanism, said method comprising:
    controlling the hydraulic pressure, in response to a driver's command to decelerate, in such a manner that said speed change mechanism causes a downshift to a gear stage capable of producing an engine brake;
    executing an engine output increasing control that increases an engine output during said downshift control irrespective of driver's accelerator operation; and
    detecting an input shaft rotational speed of said speed change mechanism,
    wherein said engine output increasing control starts when a reduction in the input shaft rotational speed of said speed change mechanism exceeds a predetermined value.

11. The control method for an automatic transmission in accordance with claim 10, further comprising:
    forcibly starting said engine output increasing control when elapsed time from the start timing of said downshift control exceeds a predetermined time, if said engine output increasing control is not started yet.

12. The control method for an automatic transmission in accordance with claim 10, further comprising: prohibiting said engine output increasing control in response to a downshift request generated within a predetermined time after a difference between an engine rotational speed and the input shaft rotational speed exceeds a predetermined value.

13. The control method for an automatic transmission in accordance with claim 10, further comprising:
    prohibiting said engine output increasing control in response to a downshift request generated within a predetermined time after an accelerator opening degree becomes smaller than a predetermined value.

14. The control method for an automatic transmission in accordance with claim 10, further comprising: prohibiting said engine output increasing control in response to a downshift request generated during a fuel cut delay control, when fuel cut delay information is received from an engine control computer that is executing a fuel cut delay control that delays start timing of a fuel cut operation.

15. The control method for an automatic transmission in accordance with claim 10, further comprising:
    immediately decreasing a hydraulic pressure command value to a minimum hydraulic pressure or its vicinity for a frictional engaging element to be disengaged when said downshift control is started.

16. The control method for an automatic transmission in accordance with claim 10, further comprising: executing a fuel cut operation in response to execution of said downshift control until said engine output increasing control is started.

17. The control method for an automatic transmission in accordance with claim 16, wherein:
    the fuel cut operation is executed only when an engine control computer is executing a fuel cut delay control that delays start timing of the fuel cut operation.

18. The control method for an automatic transmission in accordance with claim 16, wherein the fuel cut operation is executed when an accelerator opening degree is less than a predetermined value.

* * * * *